United States Patent
Nguyen

(10) Patent No.: US 10,014,713 B1
(45) Date of Patent: Jul. 3, 2018

(54) REDUNDANT SECONDARY POWER SUPPORT SYSTEM

(71) Applicant: Amazon Technologies, Inc., Reno, NV (US)

(72) Inventor: Huyen Van Nguyen, Bothell, WA (US)

(73) Assignee: Amazon Technologies, Inc., Reno, NV (US)

( * ) Notice: Subject to any disclaimer, the term of this patent is extended or adjusted under 35 U.S.C. 154(b) by 849 days.

(21) Appl. No.: 14/449,032

(22) Filed: Jul. 31, 2014

(51) Int. Cl.
| | |
|---|---|
| *H02J 1/10* | (2006.01) |
| *H02J 3/38* | (2006.01) |
| *H02J 9/00* | (2006.01) |
| *H02J 9/06* | (2006.01) |
| *G06F 1/30* | (2006.01) |

(52) U.S. Cl.
CPC ............. *H02J 9/061* (2013.01); *G06F 1/305* (2013.01)

(58) Field of Classification Search
CPC .............. H02J 9/06; H02J 9/061; G06F 1/305
USPC .......................................................... 307/23
See application file for complete search history.

(56) References Cited

U.S. PATENT DOCUMENTS

| | | | | |
|---|---|---|---|---|
| 6,191,500 | B1 * | 2/2001 | Toy ........................... | H02J 3/46 307/64 |
| 2005/0200205 | A1 * | 9/2005 | Winn ...................... | H02J 9/062 307/64 |
| 2015/0380968 | A1 * | 12/2015 | Lee ......................... | H02J 9/061 713/300 |

OTHER PUBLICATIONS

U.S. Appl. No. 14/020,499, filed Sep. 6, 2013, Huyen van Nguyen.
Passmore, Brandon, "Design and Development of a Low Cost, Manufacturable High Voltage Power Module for Energy Storage Systems—Phase I SBIR", Sep. 27, 2012, pp. 1-14., Arkansas Power Electronics International, Fayetteville, AR.
"Understanding Electric Demand", National Grid, Dec. 2005, pp. 1-4, Syracruse, NY.
Spears, ED, "Parallel UPS configurations—Connecting multiple UPS modules for added capacity or redundancy", Jan. 2009, pp. 1-10, Eaton Corporation.
"Understanding Demand and Consumption", Duke Energy, http://www.think-energy.net/KWvsKWH.htm, pp. 1-8 [Retrieved Jul. 10, 2014].
U.S. Appl. No. 14/463,476, filed Aug. 19, 2014, Huyen van Nguyen.

(Continued)

*Primary Examiner* — Carlos Amaya
(74) *Attorney, Agent, or Firm* — Robert C. Kowert; Meyertons, Hood, Kivlin, Kowert & Goetzel, P.C.

(57) ABSTRACT

An energy storage system (ESS) provides redundant power feed support to a power system which provides secondary power support to a set of electrical loads, independently of a power system which provides primary power support. The power inlet connection of the power system can be switched between a utility power feed and a discharge feed from the ESS based on determinations regarding whether the utility feed is interrupted. The ESS and the power system can each be coupled to the utility power feed via separate breaker-supported power line connections, which themselves can be coupled via a breaker-supported branch circuit downstream of the power line connection breakers. The branch circuit breaker can be closed, to switch the power inlet connection from the utility power feed to the ESS, based at least in part upon a determination of a voltage difference across the branch circuit breaker.

20 Claims, 10 Drawing Sheets

(56) References Cited

OTHER PUBLICATIONS

M. Wang, et al "Real-Time Power Quality Waveform Recognition with a Programmable Digital Signal Processor", Department of Electrical Engineering, University of Washington, Jun. 3, 2010, pp. 1-7.
"Energy Storage Modules, Developing a Smarter Grid Using Battery Energy Storage Systmes", ABB Inc., May 31, 2012, pp. 1-37.
"Energy Storage Modules (ESM), Up to 4 MW Output Voltage Range of 120 Volts to 40.5 KV". ABB Inc., Apr. 2012, pp. 1-20.
"EssPro Energy Storage Power Conversion System (PCS) The Power to Control Energy", ABB Inc., 2014, pp. 1-12.
"EssPro Energy Storage Grid Substation The Power to Control Energy", ABB Inc., 2014—pp. 1-8.

\* cited by examiner

REDUNDANT SECONDARY POWER SUPPORT SYSTEM

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage. A network of cabling, bus bars, power connectors, and power distribution units, is used to deliver the power at the lower voltage to numerous specific components in the facility.

Some data centers have no redundancy at the PDU level. Such data centers may have a large affected zone when a UPS or PDU failure in the power system occurs. In addition, some data centers have "single threaded" distribution via the electrical supply to the floor, and in which maintenance can only be performed when the components are shut-off.

Some data centers include back-up components and systems to provide back-up power to servers in the event of a failure of components or systems in a primary power system. In some data centers, each primary power system may have its own back-up system that is fully redundant at all levels of the power system. For example, in a data center having multiple server rooms, each server room may have its own primary power system and back-up power system. The back-up system for each server room may have a switchboard, uninterruptible power supply (UPS), and floor power distribution unit (PDU) that mirrors a corresponding switchboard, uninterruptible power supply, and floor power distribution unit in the primary power system for that server room. Providing full redundancy of the primary power systems may, however, be very costly both in terms of capital costs (in that in may require a large number of expensive switchboard, UPSs, and PDUs, for example) and in terms of costs of operation and maintenance. In addition, with respect to the primary computer systems, special procedures may be required to switch components from the primary system to a back-up system to ensure uninterrupted power supply for the servers, further increasing maintenance costs.

Some back-up power systems receive power from one or more utility power sources. Where such power sources are interrupted, back-up power support can be interrupted. As a result, where the utility power feeds to both the primary and back-up power system are interrupted, power support for the loads may be lost. While some power systems may provide power via one or more back-up generators, UPSs, etc., the power requirements of the load may exceed the power support capabilities of such generators, UPSs, etc. In addition, where utility power is interrupted for an extended period of time, the duration of the interruption may exceed the power generation capacities of such generators, UPSs, etc.

Figure 1:
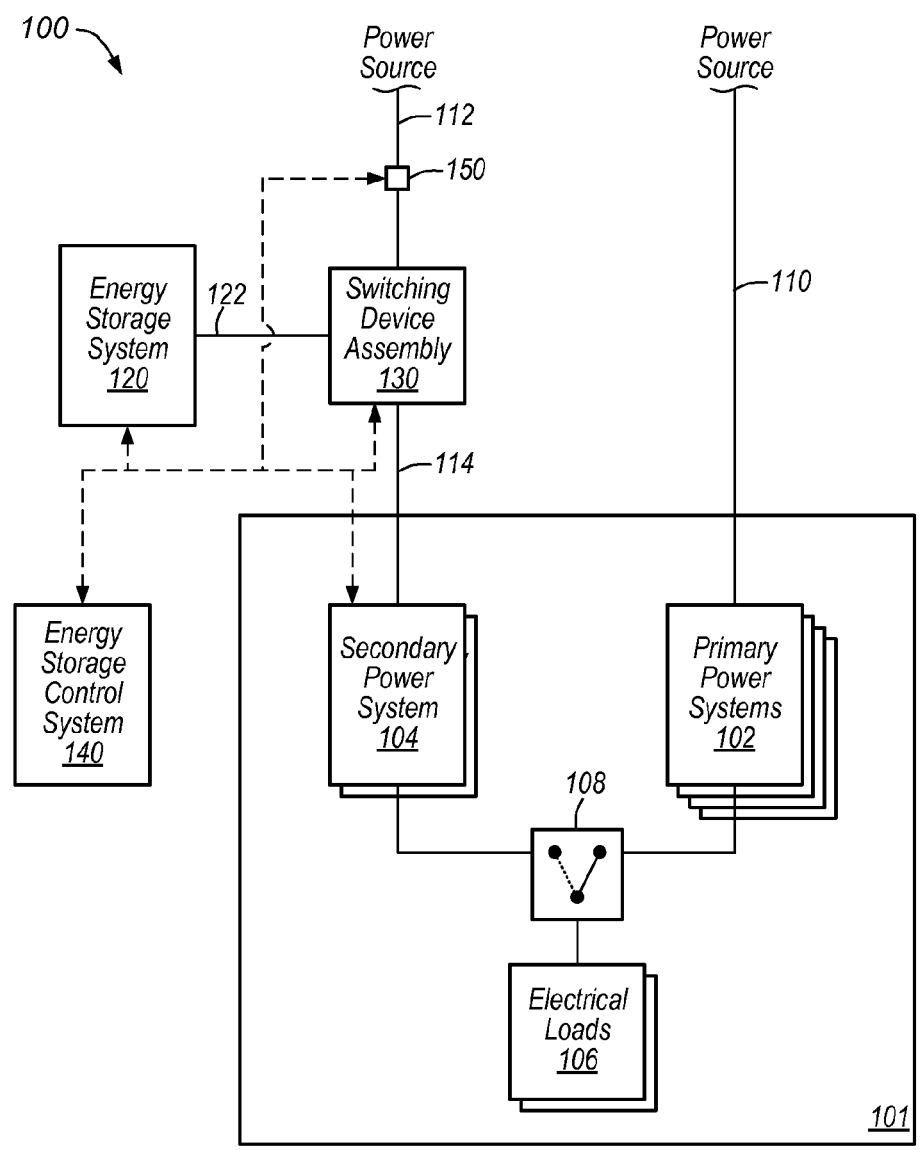
FIG. 1 is a block diagram illustrating a facility including a primary power system and secondary power system supporting electrical loads, and an energy storage system providing redundant power feed support to the secondary power system, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a redundant secondary power system which provides secondary power support to electrical loads, independently of a primary power system, and includes power feed redundancy via an energy storage system (ESS) are disclosed. According to one embodiment, a data center includes sets of rack computer systems which perform computing operations, a primary power system which provides primary power support to the rack computer systems, a secondary power system which provides secondary power support, independently of the primary power support, to the rack computer systems, an ESS which selectively stores power, received from a utility power feed via a power connection, or discharges the stored power via the same power connection based at least in part upon an absence of receiving power from the utility power feed via the power connection. A switching device assembly selectively routes, via a power inlet connection of the secondary power system, electrical power from one of the utility power feed or power discharged from the ESS. An energy storage control system commands the switching device assembly to selectively switch between routing electrical power from the utility power feed or power discharged from the ESS, based at least in part upon a determination of an interruption of the utility power feed.

According to one embodiment, an apparatus includes an energy storage control system which provides power feed redundancy to a secondary power system of a data center. The secondary power system provides secondary power support to rack computer systems in a data center, independently of a primary power system which provides primary power support to the rack computer systems. The energy storage control system is communicatively coupled to a switching device assembly, and the energy storage control system commands the switching device assembly to selectively switch a power inlet connection of the secondary power system between one of a utility power feed and an ESS discharge feed.

According to one embodiment, a method includes providing power feed redundancy to a secondary power system of a data center. The secondary power system provides secondary power support to rack computer systems in a data center, independently of a primary power system which provides primary power support to the rack computer systems. Providing power feed redundancy includes commanding a switching device assembly to switch the power inlet connection of the secondary power system between a utility power feed or an ESS discharge feed. Such providing and commanding can be performed by some or all of a computer system.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, "operating power" means power that can be used by one or more computer system components. Operating power may be stepped down in a power distribution unit or in elements downstream from the power distribution units. For example, a server power supply may step down operating power voltages (and rectify alternating current to direct current).

As used herein, providing power "support", power feed support, etc. refers to providing one or more power feeds to be available to one or more downstream systems and components, including one or more electrical loads. Such provided power feeds may be precluded from being received by the systems and components but may be made available for receipt based at least in part upon a positioning of one or more components upstream of the systems and components. For example, a reserve power system can provide reserve power support to an electrical load by providing a reserve power feed that can be selectively routed to the load by a transfer switch that is downstream of the reserve power system and upstream of the load, where the transfer switch may selectively route the reserve power feed or a primary power feed to the load based at least in part upon one or more conditions associated with the primary power feed.

As used herein, "primary power" means any power that can be supplied to an electrical load, for example, during normal operating conditions.

As used herein, "reserve power", "secondary power", etc. means power that can be supplied to an electrical load upon the failure of, or as a substitute for, primary power to the load.

As used herein, "computer system" includes any of various computer systems or components thereof. One example of a computer system is a rack-mounted server. As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, a "module" is a component or a combination of components. A module may include functional elements and systems, such as computer systems, circuit boards, racks, blowers, ducts, and power distribution units, as well as structural elements, such a base, frame, housing, or container.

As used herein, one component in a power infrastructure is "downstream" from another component in the system if the one component receives power from the other component or is at a lower level in the system than the other component. For example, a floor power distribution unit (PDU) may be downstream from a UPS, or a data center may be downstream from a power plant.

As used herein, a "power feed" includes power from any source, including but not limited to power received from a utility power source that can be supplied to an electrical load. In some embodiments, a "power feed" may be received from the output of a transformer. For example, a low-voltage power feed received from a transformer may include low-voltage power received over a low-voltage power transmission line coupled to the transformer.

As used herein, "power transmission line" a line that transmits power from one component to another component. Examples of power transmission lines include conductors that carry power from a UPS to a floor PDU, conductors that carry power from a floor PDU to a rack PDU, and conductors that carry power from a rack PDU to a server power supply unit, and power lines. Power transmission lines may have any form, such as a cable, bus bar, or other conductive member or device.

As used herein, "switching device" or "switch" includes an electrical switch that can break an electrical current. A switching device can interrupt a power flow, divert one of the source or output of a power feed, etc. For example, a switching device may selectively route a power feed from one of two or more sources to a single output.

As used herein, "switchgear" includes electrical switching devices, fuses, circuit breakers, or combinations thereof used to isolate components in an electrical system. Switchgear can isolate downstream components from upstream power feeds. In some embodiments, switchgear isolates components to protect the equipment from electrical faults elsewhere in an electrical system. For example, switchgear in a computing facility may isolate various electrical and computing systems in the facility from upstream power feeds. In some embodiments, switchgear includes switching devices, fuses, circuit breakers, or combinations thereof used to switch between separate power sources and can include one or more transfer switches.

As used herein, one component in a system is "upstream" from another component in the system if the one component supplies power to the other component or is at a higher level in the system than the other component. For example, an electrical substation supplying power to a data center may be upstream from the data center, or a transformer may be upstream from a UPS.

As used herein, "stepping", "step up", "step down", and the like refer to changing a voltage. For example, a transformer that increases a voltage of a power feed from a low voltage to a high voltage "steps up" the voltage of the power feed. In another example, a transformer that decreases a voltage of a power feed from a high voltage to a low voltage "steps down" the voltage of the power feed.

In various embodiments, redundant power is provided for many different power distribution systems, also referred to herein as "power systems". In one embodiment, power redundancy is sized such that a system can support any N distribution system failures. In some embodiments, part or all of a reserve power system is oversubscribed to achieve N+1 redundancy for a data center (rather than, for example, 2N power redundancy). In some embodiments, a system having less than one-to-one redundancy may include overload protection, such as a breaker system, to protect against overload of a reserve power system.

In some embodiments, one or more reserve power systems provide back-up power support (also referred to as "reserve power support", "secondary power support", etc.) for systems and components from top to bottom in a power distribution chain. In certain embodiments, a reserve power system backs up a primary power system including a transformer that receives power from a utility feed, a backup generator for the utility feed, a switchboard that receives power from the transformer, one or more UPSs that receive power from the switchboard, and one or more power distribution units.

In some embodiments, a reserve power system provides reserve power support to multiple systems and components that receive primary power support from one or more separate primary power systems. Reserve power can be distributed from a given reserve power system to multiple systems and components to provide reserve power upon demand by one or more of such systems and components. For example, a reserve power output from a reserve power system may be distributed along one or more power bus bars to which multiple electrical loads are coupled, and each load may selectively switch to receiving reserve power from the bus bar based on certain conditions, including loss of, or a fault condition regarding a primary power system supplying primary power support to the load.

In some embodiments, a given reserve power system is coupled to one or more electrical loads whose total ("collective") power requirements exceed the reserve power capacity of that reserve power system. Such a reserve power system is "oversubscribed" with respect to the electrical loads. An oversubscribed reserve power system may be configured to provide reserve power support to only a limited selection of the electrical loads at any given time, such that the required power supply capacity of the reserve power system meets the reduced power requirements of the supported loads at any given time. For example, the reserve power system may be used to provide power to a load during maintenance of some or all of one or more primary power systems supporting that particular load, a limited number of loads that are less than the total number of loads, etc.

In some embodiments, a reserve power system receives power from one or more various power sources. A reserve power system may receive power from a utility power source, which may be a common or different power source from a utility power source from which a primary power system receives power. While a reserve power system which receives a utility power feed from a different utility power source than the power source to the primary power system may provide power support redundancy if the utility power source for the primary power system is lost, the reserve power system may be at risk of losing power feed support if the utility power feeds for both the primary and reserve power systems are lost during overlapping time periods. For example, a common electrical grid failure which affects both utility power sources, such as a substation failure, may result in a failure of separate utility power feed. Another possible cause can include an environmental catastrophe, including tornado activity, which could result in interruption of utility power from multiple separate sources. Such scenarios, and others, can result in an "islanding" scenario, wherein the power systems are cut off from utility power sources and feeds therefrom.

While primary and reserve power systems may include internal power supplies which can provide at least some electrical power in the absence of utility power, including back-up generators, uninterruptible power supplies, etc., such power supplies may lack a capacity to provide sufficient power output to replace the lost utility power feed for extended periods. For example, where a facility is a data center which includes multiple sets of rack computer systems, the back-up generators and uninterruptible power supplies of the power systems in the data center may lack a capacity to meet the electrical power requirements of the rack computer systems for an extended period of time. As a result, where utility power feeds are lost for an extended period of time (e.g., one hour), on-site back-up generators and uninterruptible power supplies may be exhausted by electrical power requirements of on-site electrical loads, thus leading to the loss of power to said loads.

In some embodiments, one or more energy storage systems (ESS) can provide an external source of electrical power which can replace a utility power feed as an external power source to an upstream power inlet of a power system for an extended period of time. Such energy storage systems can include battery energy storage systems (BESS) which can discharge an electrical power feed which can support entire power systems for extended periods of time. For example, some ESS can store and discharge 30 megawatts of electrical power, which can include a three-phase 120-volt electrical power feed which can be discharged over a period of time of multiple hours. Some ESS can store 7.2 megawatt-hours of electrical power. In some embodiments, ESS are referred to as "grid energy storage" systems, "large-scale energy storage" systems, etc. ESS can store electrical power received from one or more power sources, including a utility power feed, and can discharge electrical power in the absence of receiving power from such power sources.

In some embodiments, one or more energy storage systems (ESS) enable power feed redundancy for a reserve power system (also referred to herein as a secondary power system). The power inlet connection of the reserve power system can be coupled to both a utility power source and an ESS via a switching device assembly, where the switching device assembly can switch the power inlet connection between a utility power feed from the utility power source and a discharge feed from the ESS, under certain conditions. Because a reserve power system may be used intermittently, some embodiments of an ESS coupled to a reserve power system may be oversubscribed to the total electrical power requirements of the various electrical loads to which the reserve power system provides reserve power support, so that the ESS discharge feed can support a limited portion of the electrical loads.

In some embodiments, a switching device assembly which can switch the reserve power system between a utility power source and an ESS includes one or more switching devices which can be commanded to switch based at least in part upon a determination that one or more power feeds are interrupted. Such a determined interruption can include a determination of a voltage difference between two separate power connections which are connected in parallel with the utility power source. For example, where two separate power bus connections are coupled to a utility power bus which carries a utility power feed, a voltage difference between the separate connections can indicate that the utility power feed is interrupted, particularly where one of the power bus connections is coupled to an ESS and another power bus connection is coupled to a power distribution system. As a result, a switching device assembly can be commanded to switch the power feed of a reserve power system from a utility power feed to an ESS discharge feed based at least in part upon a determined voltage difference between two parallel power line connections to the utility power source. The switching device assembly can include multiple switching devices, including devices which selectively electrically isolate or electrically couple various components, including the power system, ESS, etc. from the utility power source, devices which selectively electrically isolate or electrically couple the ESS and the power inlet connection of the power system, etc.

FIG. 1 is a block diagram illustrating a facility including a primary power system and secondary power system supporting electrical loads, and an energy storage system providing redundant power feed support to the secondary power system, according to some embodiments. System 100 includes a facility 101 which includes electrical loads 106, primary and secondary power systems 102, 104 which can provide power support to at least some of the electrical loads, and one or more transfer switches 108, which can include automatic transfer switches (ATS), which can selectively switch between routing electrical power from a selected one of a primary power system 102 or a secondary power system 104 to one or more electrical loads.

In some embodiments, each of the primary and secondary power systems in a facility receive electrical power from one or more various power sources, where one or more secondary power systems are configured to receive power from one of at least two separate power sources, where one of the power sources is an ESS, so that the secondary power system can continue to provide secondary power support, even in the absence of receiving power from a utility power source.

In the illustrated embodiment, primary power systems 102 receive operating power from a utility power feed 110, which can be received from a utility power source, as shown. One or more of the secondary power systems 104, however, receive operating power to provide secondary power support, via a secondary power system power inlet connection from one of a utility power feed 112 or a discharge feed 122 from an ESS 120, where the utility power feed 112 can be received from a utility power source which can be separate from the utility power source from which power feed 110 is received at a primary power system 102. A switching device assembly 130 is coupled to the secondary power system 104, a utility power source providing the utility power feed 112, and an energy storage system (ESS) configured to provide a discharge feed 122. As a result, a secondary power system 104 can receive operating power support from one of multiple separate power feeds 112, 122, thereby providing operating power redundancy for the secondary power system and configuring the secondary power system 104 to provide secondary power support to electrical loads 106 even should at least one of the power feeds 112, 122 fail.

System 100 includes an energy storage control system 140, also referred to herein as a "control system", which can command the switching device assembly 130 to switch the secondary power system power inlet connection 114 of one or more secondary power systems 104 between the utility power feed 112 and the ESS discharge feed 122. The control system 140 can command such switching, via one or more command signals generated at the control system 140 and transmitted to one or more portions of the switching device assembly 130, based at least in part upon one or more determinations regarding one or more of the power feeds 112, 122. In some embodiments, the control system 140 commands switching device assembly 130 to route electrical power from the utility power feed to the power inlet connection 114 under normal operating conditions and further commands the assembly 130 to switch from power feed 112 to discharge feed 122 based at least in part upon a determination of one or more various interruptions of the utility power feed 112. Such determination can be based in part upon sensor data generated by one or more sensor devices. One or more sensor devices which can be used to determine whether to switch between the utility power feed 112 or the discharge feed 122 can be included in the switching device assembly 130, for example at one or more terminals of one or more switching devices included in the assembly 130. In another example, as shown in the illustrated embodiment, a sensor device 150 coupled to the utility power feed 112 can generate one or more various sets of sensor data which indicate one or more various measured characteristics of the power feed 112. Such characteristics can include one or more of power feed voltage, current, waveform characteristics, time variation thereof, etc.

Control system 140, in some embodiments, is configured to communicate with one or more of the secondary power systems 104, ESS 120, etc. Control system 140 can receive data associated with such systems; for example, the control system can receive data from the ESS 120 indicating an amount of electrical power presently stored in the ESS 120, a present rate of charge or discharge of the stored electrical power, an indication of whether the ESS is charging via received electrical power or discharging stored electrical power, etc. In another example, the control system 140 can receive data from a secondary power system indicating a state of one or more various components included therein, including switchgear configurations, generator status, etc. In some embodiments, control system 140 can generate command signals to be transmitted to one or more of the ESS 120, secondary power system 104, etc. For example, control system 140 can generate a command to ESS 120 to switch between charging on received electrical power, storing electrical power, discharging stored electrical power, etc. In another example, control system 140 can generate commands to a secondary power system 104 to switch a switchgear between electrical power received from either power inlet connection 114 or a back-up generator of the power system 104, initialize or shutdown one or more said generators, etc.

Figure 2:
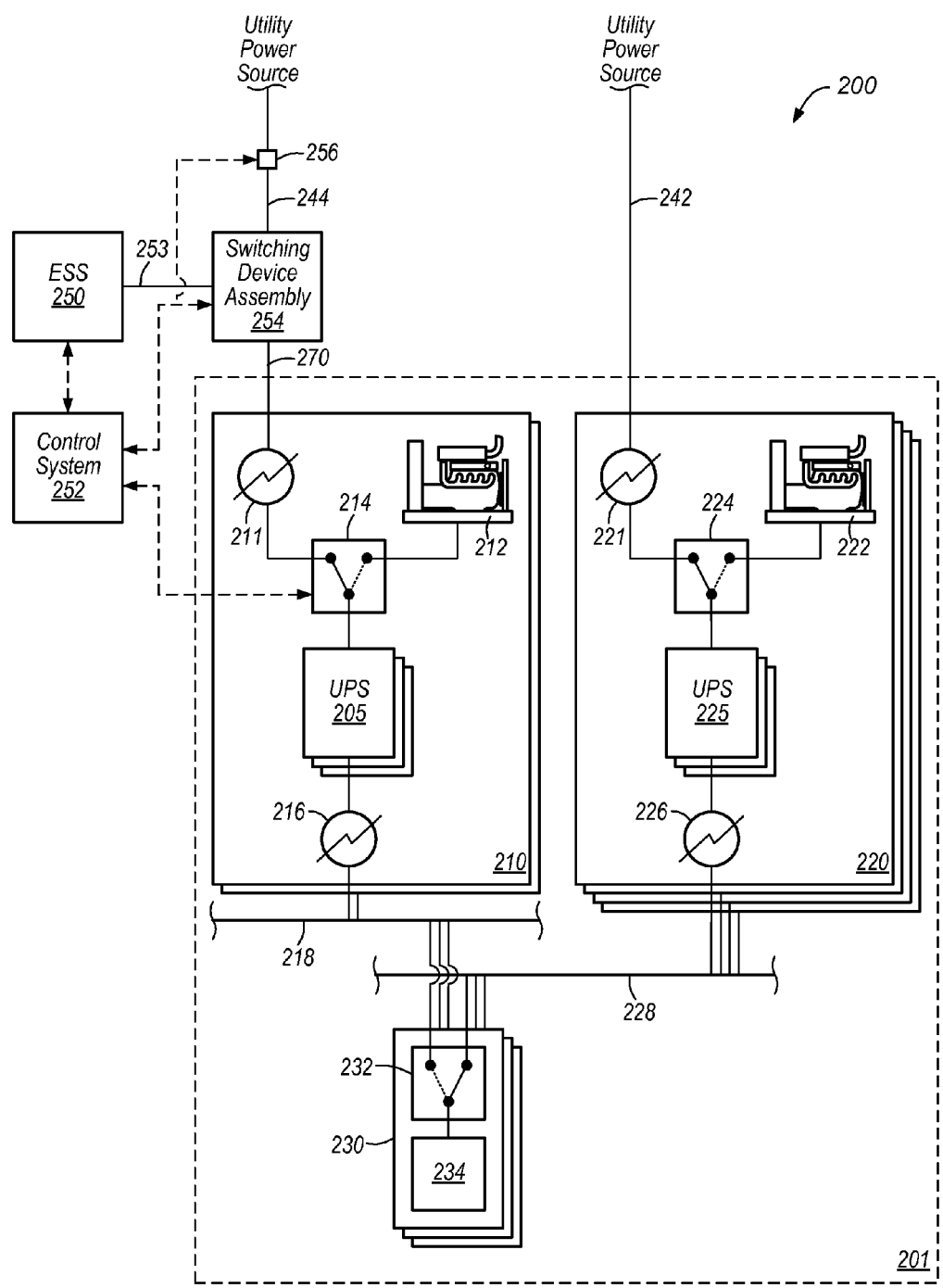
FIG. 2 is a schematic illustrating a data center having a primary power system and secondary power system supporting electrical loads, and an energy storage system providing redundant power feed support to the secondary power system, according to some embodiments.

FIG. 2 is a schematic illustrating a data center having a primary power system and secondary power system supporting electrical loads, and an energy storage system providing redundant power feed support to the secondary power system, according to some embodiments. System 200 includes a data center 201 which includes racks 230, primary and secondary power systems 210, 220 which can provide power support to at least some of the racks. The racks 230 include one or more rack computer systems 234 and one or more transfer switches 232, which can include automatic transfer switches (ATS), which can selectively switch between routing electrical power from a selected one of a primary power system 220 or a secondary power system 210 to one or rack computer systems 234 in the rack 230.

Each of the primary power systems 220 and secondary power systems 210 include a respective transformer 221, 211 coupled to the respective power feed into the respective power system, where the transformer is configured to step-down the power feed to a lower voltage. For example, where each power feed 244, 242 is a 12.8 kilovolt, 60 Hz power feed, each transformer 211, 221 can be configured to step down the respective power feed to a 480Y/277 volt three-phase power feed.

In some embodiments, a power system includes one or more back-up generators which can provide a back-up source of power if a supply of power via the power feed into the respective power system is interrupted, lost, etc. Such a back-up source of power can include one or more back-up generators, which can include various types of generators known in the art. In the illustrated embodiment, for example, each of power systems 210 and 220 include a respective back-up generator 212, 222. Generators 212, 222 may take the form of conventional turbine engines or an alternative storage energy source that includes, but not limited to, energy storage technology such as a bi-directional-inverter Lithium-ion battery system. In the illustrated embodiment, generators 212, 222 take the form of diesel-powered generators.

In some embodiments, where a power system includes a power feed which is configured to supply electrical power into the power system and a back-up generator which is configured to at least temporarily supply electrical power, particularly if the supply of power via the power feed is interrupted, the power system can include a switchgear assembly, also referred to herein as "switchgear", which can selectively switch between routing electrical power from either the power feed or a power output of the back-up generator to one or more downstream components in the power system. For example, as shown in the illustrated embodiment, where one or more of each power system 210, 220 includes a back-up generator 212, 222, the respective power system further includes a switchgear 214, 224 which is configured to selectively switch between routing electrical power downstream from a selected one of a respective power inlet connection 270, power feed 242 of the power system 210, 220 or an output of generator 212, 222 of the power system 210, 220.

As shown in the illustrated embodiment, some embodiments of primary and secondary power systems include components downstream of a transformer, where power output from such downstream components can be provided to one or more racks to provide power support from the respective power system. As shown, such downstream components in a given power system 210, 220 can include one or more uninterruptible power supplies (205, 225), one or more transformers 216, 226 which can further step-down the power feed through the respective power system to a lower voltage, etc. For example, where a power feed into a given power system 210, 220 is stepped down by a transformer 211, 221 to 480 volts, transformer 216, 226 can be configured to further step down the power feed to 415 volts. Each UPS 205, 225 may provide uninterrupted power from a respective power system 210, 220 to racks 230 in the event of a power failure upstream from the respective UPS 205, 225.

In some embodiments, one or more power systems distributes electrical power to one or more power transmission line systems which are coupled to one or more racks, so that electrical power from one or more power systems can be provided to a given rack, thereby enabling one or more power systems to provide power support to the given rack.

In some embodiments, a data center includes one or more power transmission line systems which include one or more power buses configured to carry electrical power from one or more power systems, where the one or more power systems can be coupled to the power buses to distribute power, and one or more racks can be coupled to the power buses to receive power support from the power systems coupled to the power buses. Where multiple power systems are coupled to a given power bus, each of the multiple power systems can collectively provide power support to one or more of the racks coupled to the power bus. As a result, where a data center includes multiple primary power systems, multiple secondary power systems, etc., the data center can include power busses which can enable multiple primary power systems to provide primary power support to one or more racks and can further enable multiple secondary power systems to provide secondary power support to the same one or more racks.

For example, as shown in the illustrated embodiment, data center 201 includes primary power bus 228, where each of the multiple primary power systems 220 are coupled to the power bus 228, on the downstream side of said power systems, and the racks 230 are coupled, via respective terminals of transfer switches 232 in each rack 230, to the power bus 228. Similarly, data center 201 includes secondary power bus 218, where each of the secondary power systems 210 are coupled to the power bus 218, on the downstream side of said power systems, and the racks 230 are coupled, via respective terminals of transfer switches 232 in each rack 230, to the power bus 218. As a result, each rack 230 can receive primary power support, via power bus 228, from each of the primary power systems 220 distributing electrical power to the power bus 228, and the rack 230 can further receive secondary power support, via power bus 218, from each of the secondary power system 210 distributing electrical power to the power bus 218.

In some embodiments, the capacity of one or more of the secondary power systems 210 to distribute electrical power, including to power bus 218, is exceeded by the total power requirements of the racks 230 coupled to the power bus 218 (i.e., the secondary power systems 210 are "oversubscribed" with respect to the racks 230 coupled to the power systems 210 via power bus 218). In other words, the total electrical power requirements of the racks 230 coupled to power bus 218 can exceed the capacity of one or more of the secondary power systems 210 coupled to power bus 218 to supply electrical power to the power bus 218. Because the proportion of racks 230 which may be switched to power bus 218 from power bus 228 at any given time may be a fraction of the total racks 230, the total electrical power capacity of the secondary power systems 210 may exceed the power requirements of racks 230 which are actually switched, via the respective switches 232, to power bus 218 at any given time. Providing additional power feed redundancy to the secondary power systems provides additional resiliency to the oversubscribed power systems 210 from being overloaded due to failure of one or more secondary power systems to distribute electrical power from a utility power feed. Thus, the resiliency of the data center from loss of power to racks 230 is augmented via the additional power source to the secondary power systems via the ESS, although the secondary power systems may be oversubscribed. Because a secondary power system may be expected to actually provide electrical power to one or more racks for less time than a primary power system, the ESS 250 configured to provide power to a secondary power system 210 where a utility power feed 244 is interrupted may be configured to provide an amount of electrical power which is less than the total power requirement of the total racks 230 coupled to the power systems 210, such that the power system 210 remains oversubscribed when the ESS 250 provides power to the power system 210 via connection 270. As a result, power support redundancy can be achieved with an ESS 250 which is significantly smaller than an ESS which would be required to be at least fully subscribed to electrical loads 234 if coupled to the power feed 242 of the primary power systems 220.

In some embodiments, the secondary power systems, being configured to receive a power inlet connection 270 from one of multiple separate power sources, including an ESS 250, have increased power feed redundancy relative to a power system which relies on a single power feed, such as power systems 220, for power feed support. As a result, In some embodiments, each of the primary and secondary power systems in a data center receive electrical power from one or more various power sources, where one or more secondary power systems are configured to receive power from one of at least two separate power sources, where one of the power sources is an ESS, so that the secondary power system can continue to provide secondary power support, even in the absence of receiving power from a utility power source.

In the illustrated embodiment, primary power systems 220 receive operating power from a utility power feed 242, which can be received from a utility power source, as shown. One or more of the secondary power systems 210, however, receive operating power to provide secondary power support, via a secondary power system power inlet connection 270, from one of a utility power feed 244 or a discharge feed 253 from an ESS 250, where the utility power feed 244 can be received from a utility power source which can be separate from the utility power source from which power feed 242 is received at a primary power system 220. A switching device assembly 254 is coupled to the secondary power system 210, a utility power source providing the utility power feed 244, and an energy storage system (ESS) 250 configured to provide a discharge feed 253. As a result, a secondary power system 210 can receive operating power support from one of multiple separate power feeds 244, 253, thereby providing operating power redundancy for the secondary power system and configuring the secondary power system 210 to provide secondary power support to racks 230 even should at least one of the power feeds 244, 253 fail.

System 200 includes an energy storage control system 252, also referred to herein as a "control system", which can command the switching device assembly 254 to switch the secondary power system power inlet connection 270 of one or more secondary power systems 210 between the utility power feed 244 and the ESS discharge feed 253. The control system 252 can command such switching, via one or more command signals generated at the control system 252 and transmitted to one or more portions of the switching device assembly 254, based at least in part upon one or more determinations regarding one or more of the power feeds 244, 253. In some embodiments, the control system 252 commands switching device assembly 254 to route electrical power from the utility power feed 244 to the power inlet connection 270 under normal operating conditions and further commands the assembly 254 to switch from power feed 244 to discharge feed 253 based at least in part upon a determination of one or more various interruptions of the utility power feed 244. Such determination can be based in part upon sensor data generated by one or more sensor devices. One or more sensor devices which can be used to determine whether to switch between the utility power feed 244 or the discharge feed 253 can be included in the switching device assembly 254, for example at one or more terminals of one or more switching devices included in the assembly 254. In another example, as shown in the illustrated embodiment, a sensor device 256 coupled to the utility power feed 244 can generate one or more various sets of sensor data which indicate one or more various measured characteristics of the power feed 244. Such characteristics can include one or more of power feed voltage, current, waveform characteristics, time variation thereof, etc.

Control system 252, in some embodiments, is configured to communicate with one or more of the secondary power systems 210, ESS 250, etc. Control system 252 can receive data associated with such systems; for example, the control system can receive data from the ESS 250 indicating an amount of electrical power presently stored in the ESS 250, a present rate of charge or discharge of the stored electrical power, an indication of whether the ESS is charging via received electrical power or discharging stored electrical power, etc. In another example, the control system 252 can receive data from a secondary power system indicating a state of one or more various components included therein, including switchgear configurations, generator status, etc. In some embodiments, control system 252 can generate command signals to be transmitted to one or more of the ESS 250, secondary power system 210, etc. For example, control system 252 can generate a command to ESS 250 to switch between charging on received electrical power, storing electrical power, discharging stored electrical power, etc. In another example, as shown in the illustrated embodiment, control system 252 can generate commands to a switchgear 214 in a secondary power system 210 to switch between power inlet connection 270, received at the switchgear via a transformer 211, or a back-up generator 212, initialize or shutdown one or more said generators 212, etc.

In some embodiments, system 200 is included in one or more of various other systems illustrated and discussed herein, including system 100 illustrated in FIG. 1.

Figure 3A:
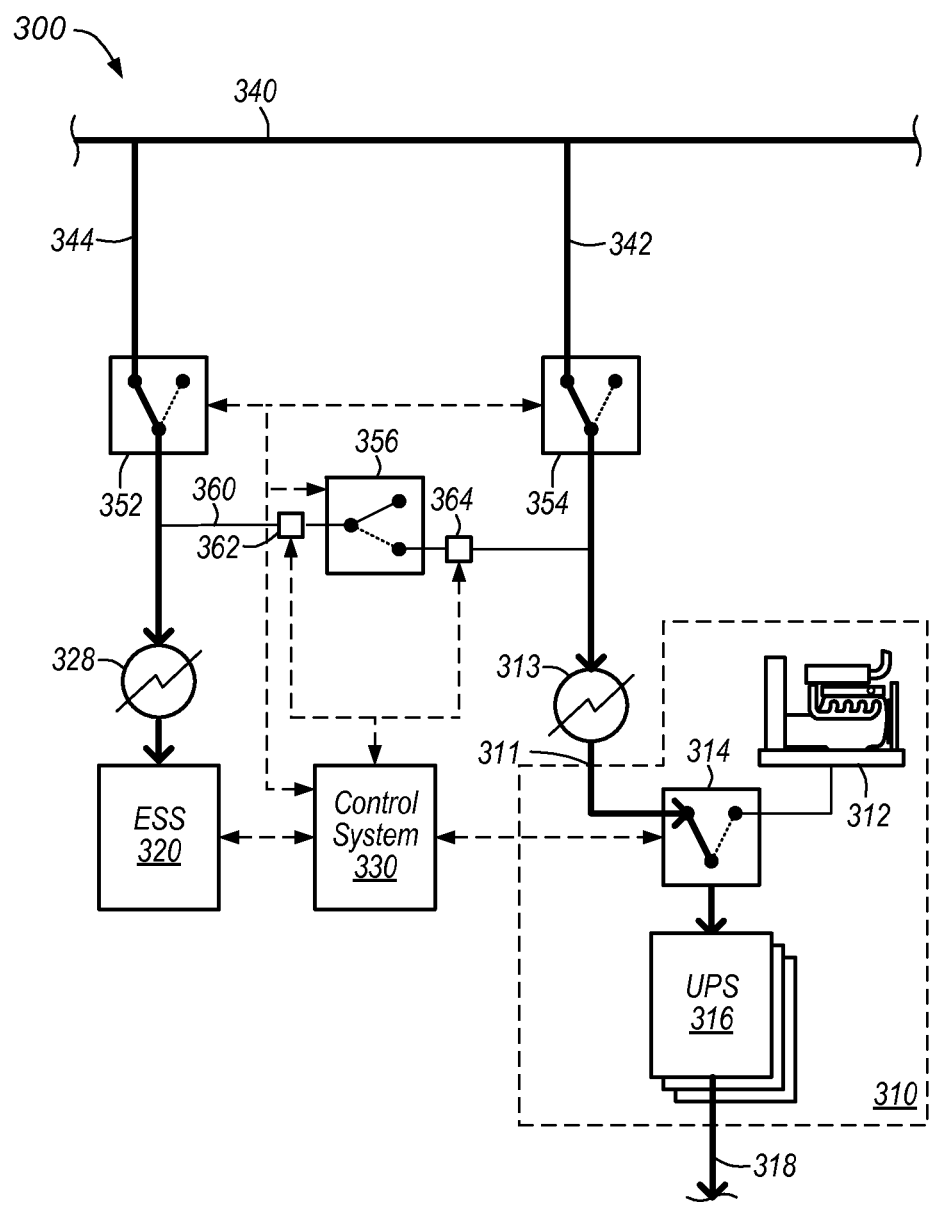
FIG. 3A-B are schematics illustrating an energy storage system and power system coupled to a common utility power feed via a switching device assembly of multiple switching devices which are configured to selectively isolate the energy storage system and power system from the utility power feed and electrically couple the energy storage system and power system together, according to some embodiments.
Figure 3B:
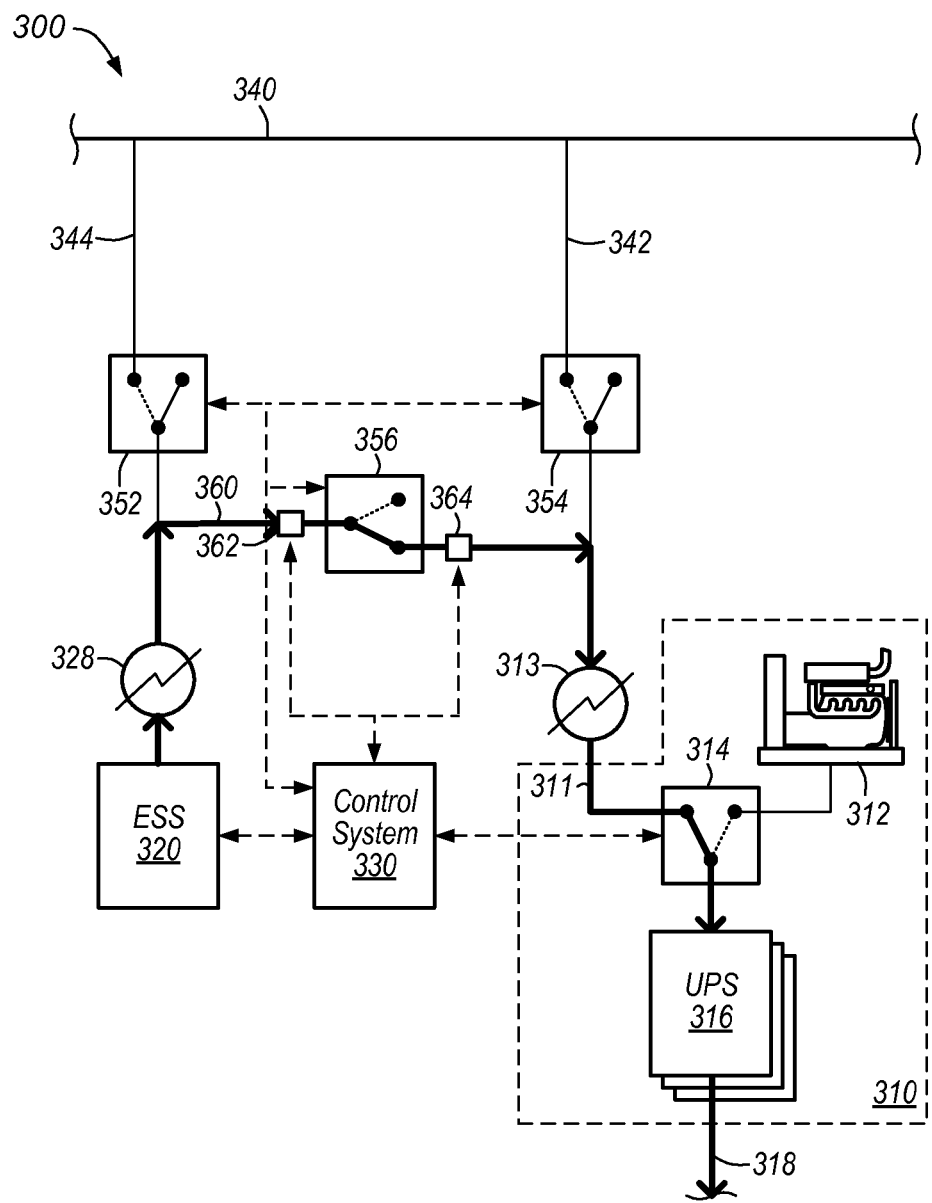

FIG. 3A-B are schematics illustrating an energy storage system and power system coupled to a common utility power feed via a switching device assembly of multiple switching devices which are configured to selectively isolate the energy storage system and power system from the utility power feed and electrically couple the energy storage system and power system together, according to some embodiments.

System 300 includes a secondary power system 310 configured to provide secondary power support, independently of one or more primary power systems, via a secondary power output 318 provided to one or more various electrical loads. The secondary power system 310 includes a power inlet connection 311, generator 312, switchgear 314 which is configured to selectively route power from the power inlet connection 311 or generator 312, one or more UPSs 316, and the power output 318 configured to distribute secondary electrical power from the power system 310 to provide secondary power support to various electrical loads. In some embodiments, system 300 is included in one or more of various other systems illustrated and discussed herein, including system 100 illustrated in FIG. 1, system 200 illustrated in FIG. 2, etc.

As shown, system 300 is configured to supply electrical power to the secondary power system, via power inlet connection 311, from one of two separate power sources. Utility power bus 340 can carry a utility power feed from one or more utility power sources, and ESS can provide a discharge feed via stored electrical power. In some embodiments, as shown, both the power system 310 and the ESS 320 can be coupled to the utility power bus 340 via separate, parallel power line connections 342, 344. Each separate power line connection 342, 344 includes a separate power line connection switching device 352, 354 which is configured to open or close to selectively isolate or connect the respective one of the ESS 320 or power system 310 to the utility bus bar 340, and thus the utility power feed. Each power line connection 342, 344 also includes a respective transformer 313, 328 which is configured to step-up or step down a power feed passing through the transformer. For example, a utility power feed passing from the bus bar 340 downstream to the ESS 320 through transformer 328 may be stepped-down to a lower voltage by the transformer 328, while a discharge feed passing from the ESS 320 may be stepped-up by the transformer 328.

In addition, system 300 includes a branch circuit 360 which extends between the separate power line connections 342, 344 and includes a branch circuit switching device 356 which can open or close to selectively isolate or connection the two power line connections together, thus electrically isolating or electrically coupling the ESS 320 and power system 310.

System 300 includes a control system 330 which is configured to communicate with, and control, one or more elements of system 300. In the illustrated embodiment, control system 330 is communicatively coupled to each of the switching devices 352, 354, 356 and is configured to generate command signals to each of the switching devices to control switching of same. Such command signals can be generated individually, at control system 330, for each separate switching device. Control system 330 can determine whether to generate such command signals based at least in part upon a determination regarding whether a utility power feed from the utility power bus 340 is interrupted. For example, in the illustrated embodiment, control system 330 is communicatively coupled to separate sensor devices 362, 364 located, on the branch circuit 360, proximately to opposite terminals of branch circuit switching device 356, where each separate sensor device is configured to generate sensor data indicating a voltage at the respective terminal of the branch circuit switching device 356. Where a difference in voltage between the voltage measured proximate to the opposite terminals of the branch circuit switching device 356 is determined to exceed a threshold value, control system 330 can command one or more of the various switching devices 352, 354, 356 to switch position, such that the power inlet connection 311 of system 310 is switched from receiving utility power from bus 340 to receiving discharged power from ESS 320. In some embodiments, the threshold value is exceeded by any measurable voltage difference between sensors 362, 364.

Control system 330 is communicatively coupled to ESS 320. Via such coupling control system 330 is configured to receive information associated with the ESS, including information indicating the electrical power storage capacity of the ESS 320, the proportion of the capacity which is presently stored, the rate at which the ESS 320 is charging, discharging, etc. In some embodiments, control system 330 is configured to generate command signals to the ESS to command the ESS to switch between charging (i.e., receiving and storing electrical power from an external source, such as the utility power feed) and discharging via one or more electrical connections. For example, the control system 330 can, in some embodiments, command ESS 320 to switch from charging via a utility power feed received, at a power connection of the ESS, from transformer 328 to discharging a power feed to transformer 328 via the same power connection of the ESS.

Control system 330 is communicatively coupled to switchgear 314 of the power system 310. Control system can command the switchgear 314 to switch between power inlet connection 311 or a power output from generator 312. In some embodiments, control system 330 is communicatively coupled to the generator 312 and is configured to command the generator to initialize, shut down, etc.

In some embodiments, where utility power feed via the power bus 340 is determined to be interrupted, control system 330 can command switchgear 314 to refrain from switching from power inlet connection 311 to generator 312 output. Such a command can include an override at least some control circuitry associated with the switchgear 314. For example, where the utility power feed is interrupted and the ESS 320 is fully charged, control system 330 override a control circuitry which would otherwise command switchgear 314 to switch to the generator 312 output in the event of an interruption in electrical power supplied to power inlet connection 311, so that the switchgear 314 continues to route electrical power from the power inlet connection 311 downstream from the switchgear 314. Where such an override results in a temporary interruption in power via the power feed, particularly where a time period elapse occurs between the determination of an interruption and the power inlet connection 311 receiving electrical power discharged from ESS 320, the UPS 316 can temporarily provide power output 318 during the switchover, and switchgear can subsequently route power received from ESS 320. Control system 330 can command the switchgear 314 to switch from power inlet connection 311 to an output from generator 312 based at least in part upon a determination that the utility power feed is interrupted and the remaining electrical power stored in a discharging ESS 320 is less than a threshold proportion of full capacity. In some embodiments, the control system 330 is configured to command the switchgear 314 to switch from power inlet connection 311 to the generator output based at least in part upon a determination that the ESS is fully discharged, such that the ESS has fully depleted the electrical power storage therein.

FIG. 3A-B illustrate differences in electrical power flow through system 330 based at least in part upon availability of a utility power feed and the configuration of various components in the system. The present flow of electrical power, in both figures, is illustrated through bold highlighting with arrow indicators of the direction of the electrical flow. FIG. 3A illustrates system 300 where a utility power feed is being carried by power bus 340, where power line connection switching devices 352, 354 are each in a closed position to connect the ESS 320 and power system 310 power inlet connection 311 to the power bus, respectively. As shown, utility power from the power bus 340 passes, via power line connection 344, through the power line connection switching device 352 and through transformer 328 to a power connection of the ESS 320 to the power line connection 344. The power feed received at ESS 320 can be stored by the ESS to "charge" the ESS, thereby accumulating, maintaining, etc. a storage of electrical power in the ESS. In addition, utility power from the power bus 340 passes, via power line connection 342, through the switching device 354 and through transformer 313 to the power inlet connection 311 of power system 310. From the power inlet connection 311, the power is routed downstream by switchgear 314, via UPSs 316, to be provided via an output 318 to various electrical loads.

Branch circuit switching device 356 is opened, so that branch circuit 360 does not electrically couple the power line connections 342, 344. As a result, the power line connections are electrically isolated from each other, and the utility power from power bus 340 flows through the separate power line connections 342, 344 in parallel downstream to a separate respective one of the ESS 320 or power system 310. Control system 330 can monitor the voltages, via data from sensors 362, 364, to determine whether the utility power feed is interrupted.

The state of system 300 illustrated in FIG. 3A, in some embodiments, is the normal operating state of the system 300, where utility power from power bus 340 is fed to power system 310 to enable system 310 to provide secondary power support via output 318. As shown herein, while power line connection switching devices 352, 354 are closed and branch circuit switching device 356 is open, devices 352, 354 may be referred to as "normally closed" and device 356 may be referred to as "normally open".

In the illustrated embodiment, branch circuit 360 extends between the separate power line connections 342, 344 at respective locations which may be referred to as being "upstream" of the respective transformers 328, 313, relative to the power bus 340. As a result, branch circuit 360 is configured to carry electrical power at a higher voltage than electrical power received or discharged at ESS 320, received at power inlet connection 311, etc. While branch circuit 360, and branch circuit switching device 356 are therefore configured for a greater voltage than ESS 320 or switchgear 314 or electrical power received through power inlet connection 311, for example, the branch circuit 360 and branch circuit switching device 356 can be configured for a lower electrical current than ESS 320, power inlet connection 311, switchgear 314, etc.

FIG. 3B illustrates system 300 where the utility power feed being carried by power bus 340 is interrupted. Such an interruption can be determined, at control system 330, via a determination that the voltages measured by the separate sensors 362, 364 differ. Such a measured difference can be due to various factors. For example, based on an interruption, one of power line connection switching devices 352, 354 may trip to an open position, so that electrical power is flowing from bus bar 340 to one power line connection but not another. In another example, where power fails to flow through both power line connections 342, 344 from bus 340, where both power line connection switching devices 352, 354 trip to an open position, etc., a voltage difference may be present between sensors 362 based at least in part upon ESS 320 switching from charging to discharging in the absence of a received power feed, thereby resulting in the voltage at sensor 362 being higher than at sensor 364.

As shown, where an interruption in the utility power fed is determined, control system 330 can command branch circuit switching device 356 to switch to a closed position, so that the ESS is electrically coupled to the power inlet connection 311 of the power system 310 and is thus configured to supply a discharge feed to power system 310 via the power inlet connection 311. In some embodiments, including the illustrated embodiments, control system 314 responds to a determination of an interruption by commanding any of power line connection switching devices 352, 354 which are not already opened to switch to an open state, thereby isolating power bus 340 from the rest of system 300 and restricting the power pathway of the discharge feed from the ESS 320 to flow to the power system 310. Control system 330 can command switchgear 330 to refrain from switching over to generator 312 output, even if the switching of switching devices 352-356 causes a temporary power interruption through power inlet connection 311.

As shown, where ESS 320 is switched from charging to discharging, and branch circuit switching device 356 is closed to electrically couple ESS 320 to power system 310, the flow of electrical power across transformer 328 is reversed, relative to the state of system 300 where electrical power passes from utility power bus 340 to ESS 320 via transformer 328. As a result, transformer 328 switches, from stepping-down electrical power passing from power bus 340 to ESS 320, to stepping-up electrical power passing from ESS 320 to branch circuit switching device 356. Transformer 313, however, continues to step-down electrical power passing to power inlet connection d 311. As a result, where system 300 switches the power inlet connection 311 from a utility power feed to an ESS discharge feed, the system 300 is configured to step-up the discharge feed from ESS 320 via transformer 328, pass the discharge over the branch circuit 360 between the power line connections via branch circuit switching device 356 at the stepped-up voltage, step-down the discharge feed via transformer 313, and pass the stepped-down discharge feed to the power system 310 via power inlet connection 311. In some embodiments, the stepped down voltage downstream of transformer 313 is the same voltage as the stepped down voltage downstream of transformer 328, relative to the power bus 340.

Figure 4:
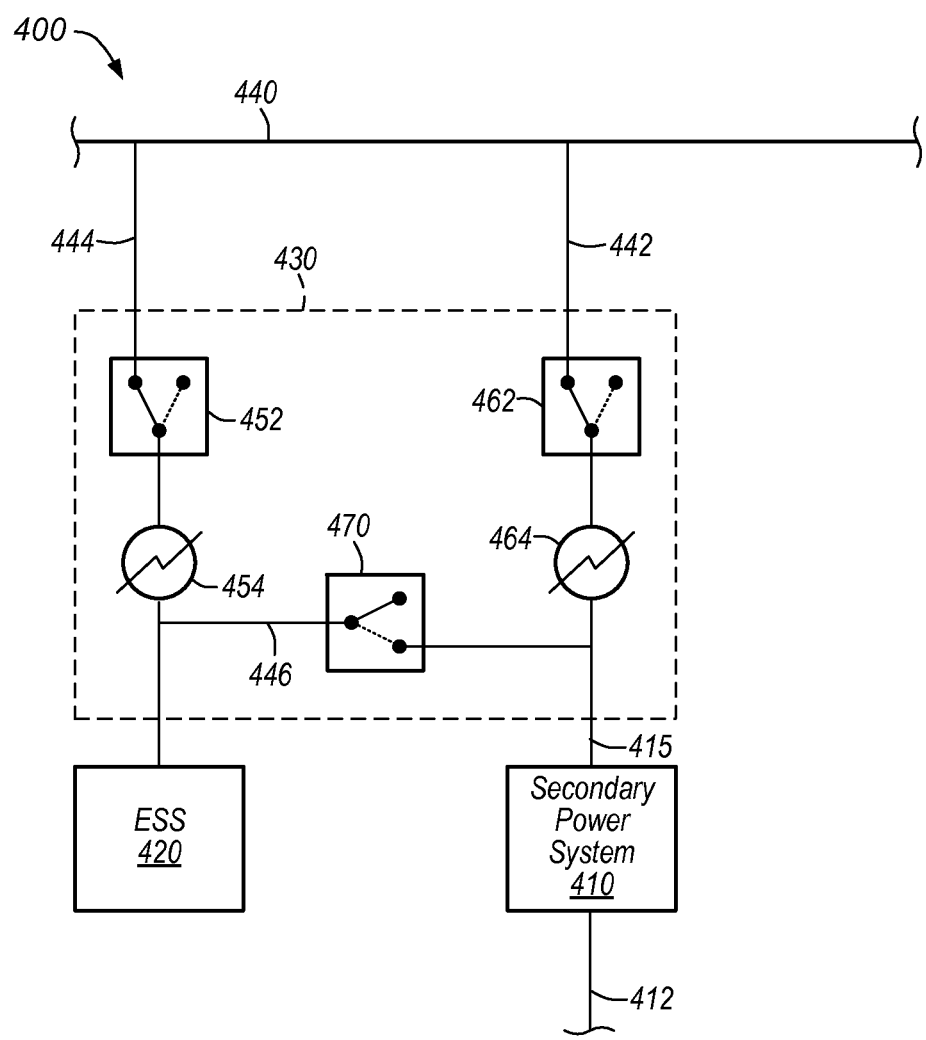
FIG. 4 is a schematic illustrating a switching device assembly which selectively couples the energy storage system and power system to a utility power feed or each other, where the switching device assembly includes transformers which step down power upstream of a branch circuit between the energy storage system and the power system, according to some embodiments.

FIG. 4 is a schematic illustrating a switching device assembly which selectively couples the energy storage system and power system to a utility power feed or each other, where the switching device assembly includes transformers which step down power upstream of a branch circuit between the energy storage system and the power system, according to some embodiments.

In some embodiments, a switching device assembly which can selectively switch a secondary power system power feed between a utility power feed or an ESS discharge feed can include a branch circuit which connects two parallel power line connections downstream of separate transformers of each respective power line connection. As a result, when a branch circuit switching device is closed to electrically couple ("connect") an ESS to a secondary power system power feed, the power feed routed from the ESS to the secondary power system via the branch circuit can be at a lower voltage than if the branch circuit connected the power line connections upstream of the transformers. In such an embodiment, although the voltage through the branch circuit is lower than upstream of the transformers, the current may be greater. As a result, while the power transmission line and the branch circuit switching device comprising the branch circuit may be configured for a reduced voltage relative to the branch circuit as shown in FIG. 3A-B, the power transmission line and the branch circuit switching device may be configured to accommodate the increased current. Such configuring can include additional insulation, relative to the amount of insulation required for a branch circuit which connections power transmission lines upstream of the transformers, as shown in FIG. 3A-B.

In the illustrated embodiment, system 400 includes a secondary power system 410 which is configured to receive electrical power via a secondary power system power inlet connection 415 and distribute secondary power via output feed 412 to provide secondary power support, independently of primary power systems, to one or more electrical loads coupled to the output feed 412. The system 400 includes a utility power bus 440 which carries a utility power feed from one or more utility power sources, an ESS 420 configured to receive, store, and discharge electrical power, and a switching device assembly 430 configured to selectively switch the secondary power system power feed 415 between a utility power feed from the utility power bus 440 or an ESS discharge feed from the ESS 420.

As shown in the illustrated embodiments, the switching device assembly 430 can include two separate and parallel power line connections 442, 444, which each couple the utility power bus 440 to a separate one of the secondary power inlet connection 415 or the ESS 420, respectively. Each power line connection 442, 444 includes a power line connection switching device 462, 452 which can selectively isolate or connect a downstream portion of the respective power line connection 442, 444 to the utility power bus 440. Each power line connection 444, 442 further includes a respective transformer 454, 464 which is configured to step-down utility power received from the power bus 440 to the ESS 420 or secondary power system power inlet connection 415, respectively. A branch circuit 446 extends between the separate power line connections 442, 444 downstream of the respective transformers 464, 454 of the power line connections, so that the branch circuit is configured to route stepped-down power between the power line connections, downstream of the transformers, when the branch circuit switching device 470 is closed to connect the power line connections 442, 444. Switching device 470 may operate in a normally-open state, and switching devices 452, 462 may operate in a normally-closed state, so that electrical power is normally routed from the utility power bus 440 to ESS 420 and the secondary power system power inlet connection 415 in parallel, where the power to each of the ESS 420 and the secondary power system power inlet connection 415 is stepped-down by a separate transformer 454, 464. Where the switching device assembly 430 switches the power inlet connection 415 from the utility power feed to the ESS discharge feed, switching devices 452, 462 can open to isolate the ESS 420 and power feed 415 from the utility power bus 440, and switching device 470 can close to connect ESS to the power feed 415, enabling the ESS 420 to discharge electrical power, at the stepped-down voltage, to the secondary power system 412 via a portion of the power line connection 444 which is downstream of transformer 454, the branch circuit 446, and power inlet connection 415.

In some embodiments, system 400 is included in one or more of various other systems illustrated and discussed herein, including system 100 illustrated in FIG. 1, system 200 illustrated in FIG. 2, system 300 illustrated in FIG. 3, etc.

Figure 5:
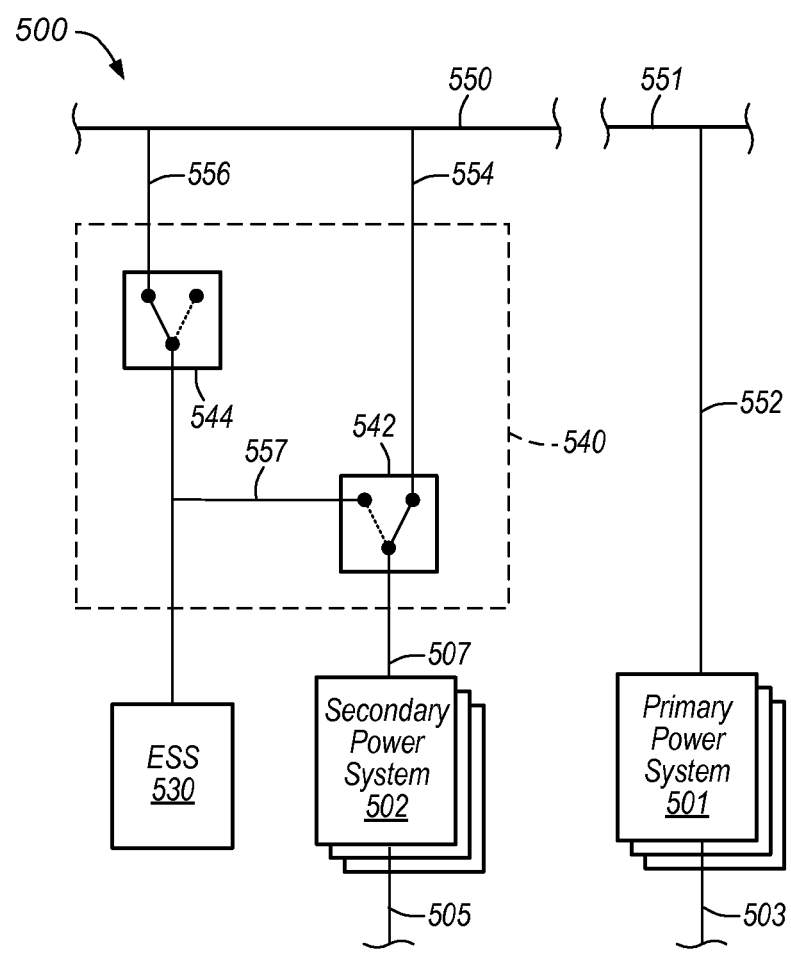
FIG. 5 is a schematic illustrating primary and secondary power systems with an energy storage system and switching device assembly which selectively couples the power feed of the secondary power system to a utility power feed or the energy storage system, according to some embodiments.

FIG. 5 is a schematic illustrating primary and secondary power systems with an energy storage system and switching device assembly which selectively couples the power feed of the secondary power system to a utility power feed or the energy storage system, according to some embodiments.

System 500 includes a primary power system 501 and secondary power system 502 which each provide a separate respective power feed 503, 505. Each separate power feed provided from a power system can be used to support operations by one or more electrical loads. Thus, a primary power system 501 can provide primary power support to electrical loads via power feed 503, and a secondary power system 503 can provide secondary power support to electrical loads via power feed 505. In some embodiments, a primary power system 501 and a secondary power system 502 each independently provide power support to a common electrical load. For example, each of a primary and secondary power system 501, 502 can be coupled, via respective power feeds 503, 505, to a transfer switch which selectively routes power from one of the power feed 503, 505 to one or more electrical loads.

In some embodiments, including the illustrated embodiment of FIG. 5, the secondary power system 502 is configured to receive power feed support from multiple separate power sources, including an ESS and a utility power source. In the illustrated embodiment, primary power system 501 is configured to receive utility power, via a power feed 552, from a utility power feed carried on a power transmission line 551 coupled to a utility power source. Secondary power system 502, however, is configured to receive electrical power, via a power inlet connection 507, from one of a discharge feed from ESS 530 or a utility power feed from power transmission line 550 which is coupled to a utility power source. In some embodiments, power transmission lines 550, 551 are separate from each other, carry a separate utility power feed from a separate utility power source, some combination thereof, etc. In some embodiments, one or more of power transmission lines 550, 551 comprises a power bus.

System 500 includes a switching device assembly 540 configured to selectively electrically couple or isolate the secondary power systems 502, ESS 530, and power transmission line 550 with each other. In some embodiments, such an assembly can include multiple switching devices which can be controlled to selectively electrically isolate or couple the various components in system 500 relative to each other. In the illustrated embodiment, switching device assembly 540 includes separate power line connections 554, 556 coupled to the power transmission line 550, and switching devices 542, 544 which at least selectively isolate or couple the power transmission line 550 from the ESS 530 and the secondary power system power inlet connection 507. Switching device 544 is controllable to switch between an open or closed position to selectively electrically couple or isolate the power transmission line 550 from a downstream circuit which connects with both the ESS and a terminal of switching device 542.

In the illustrated embodiment, switching device 542 is configured to switch between coupling the power inlet connection 507 of the secondary power systems 505 to either the power line connection 554 or a branch circuit 557 which is coupled to power line connection 556. Where switching device 542 is switch, in concert with switching device 544, the power inlet connection 507 can be switched from receiving power from line 550 to receiving power from ESS 530.

For example, in the illustrated embodiment, switching device 544 is in a closed position, and switching device 542 is switched to route power from power line connection 554 to the power inlet connection 507. As a result, power is routed separately through both power line connections 554, 556, in parallel with each other, to a separate one of the ESS 530 or the power inlet connection 507, so that the secondary power system 502 receives power feed support from power transmission line 550 and the ESS 530 receives power from power transmission line, which the ESS can use to accumulate or maintain a storage of electrical power. Where switching device 544 is opened, and switching device 542 is switched to the branch circuit 557, both the ESS 530 and power feed 507 are isolated from power transmission line 550, while the power feed is electrically coupled to the ESS via the branch circuit, so that the ESS can discharge stored electrical power to a secondary power system 502, via branch circuit 557, switching device 542, and power inlet connection 507.

In some embodiments, system 500 is included in one or more of various other systems illustrated and discussed herein, including system 100 illustrated in FIG. 1, system 200 illustrated in FIG. 2, system 300 illustrated in FIG. 3, etc.

Figure 6:
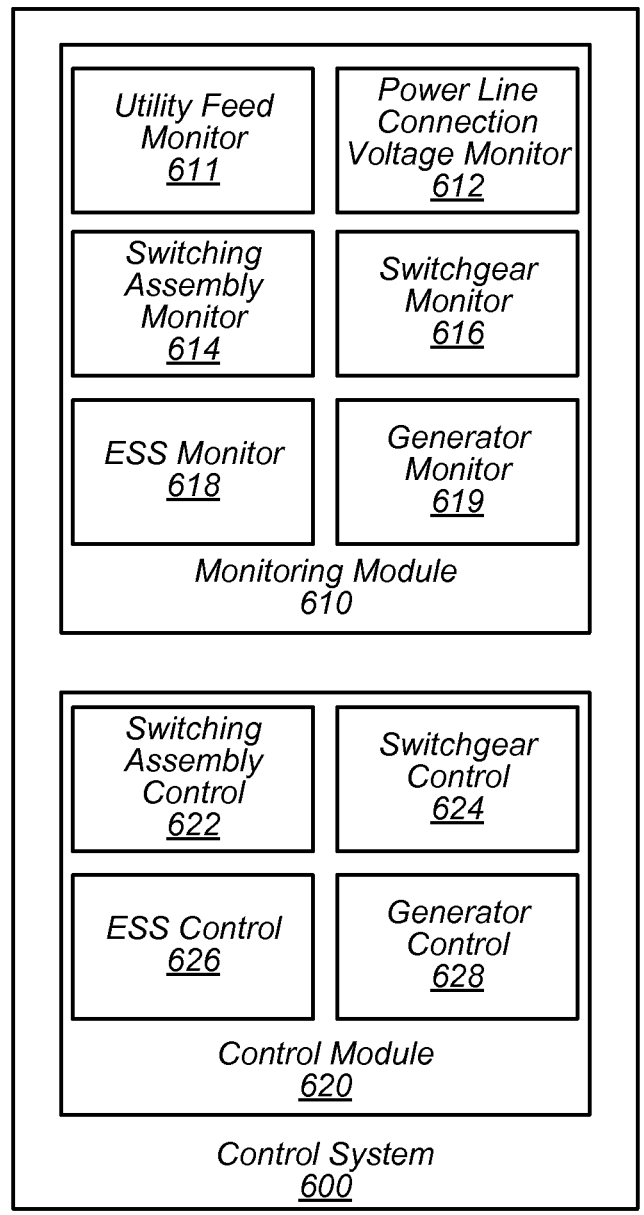
FIG. 6 is a schematic illustrating an energy storage control system which controls switching of the secondary power system between the utility power feed and the energy storage system, according to some embodiments.

FIG. 6 is a schematic illustrating an energy storage control system which controls switching of the secondary power system between the utility power feed and the energy storage system, according to some embodiments. In some embodiments, energy storage control system 600, also referred to herein as "control system 600", can be included in one or more various control systems illustrated herein, including control system 140 illustrated in FIG. 1, control system 252 illustrated in FIG. 2, control system 330 illustrated in FIG. 3A-B, etc.

Control system 600 includes a monitoring module 610 and a control module 620. Each module, and various sub-modules included therein, can include one or more various instances of hardware, including one or more computer systems. Monitoring module 610 includes various sub-modules configured to monitor various characteristics of one or more various power systems, also referred to herein as "systems". Control module 620 includes various sub-modules configured to control various electrical components included in the one or more various power systems.

In some embodiments, monitoring module 610 includes a utility feed monitor sub-module 611 which is configured to monitor one or more various characteristics of a utility power feed which can be selectively electrically coupled or isolated relative to a power feed of a secondary power system. Sub-module 611 can monitor such characteristics based at least in part upon sensor data received from one or more sensor devices coupled to a power transmission line carrying the utility power feed. For example, where a sensor device is coupled to such a power transmission line, including sensor device 150 illustrated in FIG. 1, the sensor device may generate sensor data which, when received at control system 600, is processed by sub-module 611 to determine one or more characteristics of the utility power feed, including voltage, current, time variations thereof, etc. In some embodiments, sub-module 611 compares such determined characteristics with one or more predetermined threshold values associated with said characteristics and determines that the utility power feed is interrupted if one or more of the threshold values is exceeded.

In some embodiments, monitoring module 610 includes a power line connection voltage monitor sub-module 612 which is configured to monitor voltage associated with separate power line connections which are coupled to a separate one of an ESS or a secondary power system power feed. Sub-module 612 can determine, based at least in part upon sensor data received from separate voltage sensors that are each coupled to a portion of a branch circuit connected to a separate power line connection and proximate to a separate terminal of a branch circuit switching device, can determine a difference between the voltages across the branch circuit switching device. The sub-module 612 can, in some embodiments, compare a determined voltage difference with one or more threshold values associated with voltage difference and determine that the utility power feed is interrupted if one or more of the threshold values is exceeded by the determined voltage difference.

In some embodiments, monitoring module 610 includes a switching device assembly monitor sub-module 614 which is configured to monitor a switching state, also referred to herein as switch position, of various switching devices included in the switching device assembly. For example, sub-module 614 can determine that a branch circuit switching device, including device 470 in FIG. 4, is open and that devices 452, 462 are closed. Where a switching device switches in position, sub-module 614 can track such changes.

In some embodiments, monitoring module 610 includes a secondary power system switchgear monitor sub-module 616 which is configured to monitor a switching state, also referred to herein as switch position, of one or more switching devices included a switchgear of a secondary power system. For example, sub-module 616 can determine that a switchgear of a secondary power system, including switchgear 314 in FIG. 3A-B, is switched to power feed 311. Where switchgear switches in position, via switching of one or more switching devices included in the switchgear, sub-module 616 can track such changes.

In some embodiments, monitoring module 610 includes an ESS monitor sub-module 618 which is configured to monitor a state of an ESS. For example, sub-module 618 can determine the amount of electrical power presently stored in an ESS, present charging rate, present discharge rate, whether the ESS is presently charging via a received power feed, discharging a power feed via stored electrical power, etc. Where an ESS switches in state, e.g., switches from charging to discharging, sub-module 618 can track such changes.

In some embodiments, monitoring module 610 includes a secondary power system generator monitor sub-module 619 which is configured to monitor a state of secondary power system generator. For example, sub-module 619 can determine the power capacity, present operating state, etc. of one or more back-up generators included in a secondary power system. Where a generator switches in state, e.g., switches from off-line to on-line and generating power, sub-module 620 can track such changes.

In some embodiments, control module 620 includes a switching device assembly control sub-module 622 which is configured to generate command signals to various switching devices included in a switching device assembly to switch a power inlet connection of a secondary power system between a utility power feed or an ESS discharge power feed. Such command signal generation can include generating multiple separate command signals to separate switching devices included in the switching device assembly. For example, in response to a determination that a utility power feed is interrupted, sub-module 622 can generate command signals to a branch circuit switching device to close to electrically couple the ESS with the power inlet connection of the secondary power system and can further generate command signals to two power line connection switching devices to open to electrically isolate the ESS and the power inlet connection of the secondary power system from the utility power feed.

In some embodiments, to generate command signals, sub-module 622 is configured to determine whether the utility power feed is interrupted. Such a determination can be based at least in part upon determinations made in one or more sub-modules of monitoring module 610. For example, where sub-module 612 determines that a voltage difference across a branch circuit switching device exceeds a threshold value, sub-module 622 can determine that the utility power feed is interrupted and can respond by generating commands to various switching devices in the switching device assembly to switch the secondary power system power inlet connection from the utility power feed to an ESS discharge feed. Similarly, where sub-module 614 determines that the secondary power system is electrically coupled to the ESS, and module 611 determines that the utility power feed is available, sub-module 622 can generate commands to switching devices in the switching device assembly to switch the secondary power system power inlet connection from the ESS to the utility power feed.

In some embodiments, control module 620 includes a switchgear control sub-module 624 which is configured to generate command signals to various switching devices included in a switchgear of a secondary power system to switch between routing electrical power, to one or more downstream components, from a power inlet connection of the secondary power system or an output of one or more back-up generators of the secondary power system. Sub-module 624, in some embodiments, is configured to generate command signals to the switchgear to refrain from switching from the power inlet connection to the generator output, even if a supply of electrical power via the power inlet connection is interrupted. Such a command signal can be based at least in part upon a determination by one or more sub-modules in control system 600, that the utility power feed is interrupted and that the ESS is not discharged beyond a threshold level, is not projected to be discharged beyond the threshold level within a period of elapsed time associated with initialization time of a back-up generator, etc. As a result, switching can be inhibited while the switching device assembly switches from the utility power feed to the ESS discharge feed.

In some embodiments, control module 620 includes an ESS control sub-module 626 which is configured to generate command signals an ESS to switch between receiving and storing an electrical power feed (i.e., "charging") to discharging a power feed via the electrical power stored therein. Commands to switch the ESS from charging to discharging can be generated based at least in part upon a determination that the utility power feed is interrupted, that the switching device assembly is commanded to electrically couple the ESS to the power inlet connection of the secondary power system, that the ESS is electrically coupled to said power inlet connection of the secondary power system, some combination thereof, etc. Commands to switch the ESS from discharging to charging can be generated based at least in part upon a determination that the utility power feed is available and being received at a power connection of the ESS, that the switching device assembly is commanded to electrically couple the ESS to the utility power feed, that the ESS is electrically coupled to said utility power feed, some combination thereof, etc.

In some embodiments, control module 620 includes a generator control sub-module 628 which is configured to generate command signals to one or more back-up generators included in a secondary power system to switch operating states, including initializing, shutting down, etc. Sub-module 628, in some embodiments, is configured to generate command signals to a generator of a secondary power system to initialize based at least in part upon a determination that the switchgear of the secondary power system is being commanded to switch to the output of the generator, is projected to be switched to the generator output within a certain time period, etc. Sub-module 628, in some embodiments, is configured to command a generator of a secondary power system to shut down based at least in part upon a determination that the switchgear of the secondary power system has switched from the output of the generator to a power inlet connection of the secondary power system.

Figure 7:
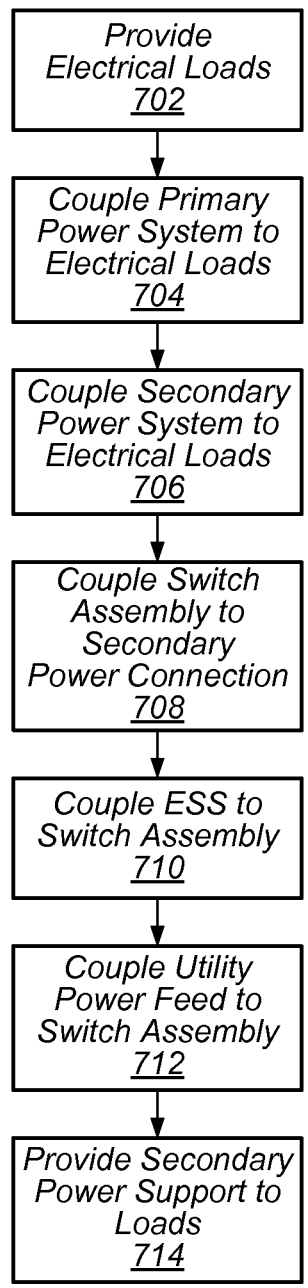
FIG. 7 illustrates configuring a secondary power system to include a redundant power feed, according to some embodiments.

FIG. 7 illustrates configuring a secondary power system to include a redundant power feed, according to some embodiments. The logic may be implemented by one or more control systems, including the control systems illustrated in FIG. 1-6. The control system may be implemented, in part or in full, by one or more computer systems, such as described further below with reference to FIG. 9.

At 702, one or more electrical loads are provided in a data center. Electrical loads can include one or more sets of rack computer systems which can be installed in a data center to perform computing operations and provide computing capacity for the data center. At 704, one or more primary power distribution systems, also referred to interchangeably herein as "primary power systems," are installed in the data center and coupled to at least some of the electrical loads to configure the primary power systems to provide primary power support to those electrical loads. Each primary power system can include a power inlet connection which is coupled to one or more utility power sources and enables the primary power system to receive power via a utility power feed from one or more utility power sources. At 706, one or more secondary power distribution systems, also referred to interchangeably herein as "secondary power systems," are installed in the data center and coupled to at least some of the electrical loads to configure the secondary power systems to provide secondary power support to those electrical loads. Each secondary power system can include a power inlet connection which can receive power from one or more various power sources. The primary and secondary power systems may, for each electrical load of a set of electrical loads in a data center, may be coupled to separate electrical inputs of a given transfer switch, where the transfer switch can switch the power feed for the electrical load between the primary power system and the secondary power system. For example, the transfer switch can be an automatic transfer switch (ATS) which can selectively route electrical power from the primary power system to one or more rack computer systems and can switch to route electrical power from the secondary power system in response to an interruption of electrical power from the primary power system. The primary and secondary power systems can be coupled to one or more electrical loads via one or more various power transmission lines, including one or more instances of cabling, power busways, etc.

At 708, the power inlet connection of the secondary power system is coupled to at least one end of a switching device assembly. The switching device assembly can include various power connections, circuits, etc. and one or more switching devices which can electrically couple, isolate, etc. various connections, circuits, etc. In some embodiments, coupling the secondary power system to a switching device assembly includes coupling the power inlet connection of the secondary power system to a downstream end of a branch circuit which includes one or more switching devices which can operate to selectively electrically couple or isolate the power inlet connection of the secondary power system to various upstream power sources, circuits, etc. At 710, an ESS is coupled, via a power connection of the ESS, to at least one end of the switching device assembly. The ESS can be configured to switch between receiving power at the power connection and discharging power at the power connection.

At 712, a utility power feed is coupled to the switching device assembly. In some embodiments, the utility power feed comprises a power bus which carries electrical power from one or more utility power sources. Coupling the utility power feed to the switching device assembly can include coupling such a power bus with one or more power line connections (also referred to herein as bus connections, branch circuits, etc.), where the power line connections carry the utility power feed from the power bus to one or more of the ESS and the secondary power system power inlet connection coupled to the switching device assembly. Where the switching device assembly comprises two separate power line connections, each coupled at one end to a separate one of the ESS power connection or the secondary power system power inlet connection, coupling the utility power feed to the switching device assembly can include coupling opposite ends of the separate power line connections to the power bus, in parallel with each other, so that each power line connection is configured to carry the utility power feed to a separate one of the ESS connection or the secondary power system power feed. In some embodiments, each power line connection includes a separate switching device, which is configured to selectively connect or isolate the coupled system to the utility power feed, and a transformer configured to step down the utility power feed through at least a portion of the power line connection.

At 714, the secondary power system is operated to provide secondary power support to one or more of the electrical loads. Providing secondary power support can include distributing a secondary power feed to a transfer switch, where the transfer switch can selectively route the secondary power feed, or a primary power feed from an independent primary power source, to the electrical load. Thus, providing secondary power support can include providing an available secondary power feed that may not be routed to the electrical load, but remains available to be routed, for example if the primary power feed fails. Providing secondary power support can include distributing electrical power received from one or more power sources. Such power sources can include one of the utility power feed or a discharge feed from ESS, where the switching device assembly selectively routes one of the feeds to the secondary power system power inlet connection. The secondary power system can distribute power received via the secondary power system power inlet connection. In some embodiments, the secondary power system can distribute power from one or more internal power sources included in the secondary power system, including a back-up generator device, and uninterruptible power supply, etc. Such power sources may be used to provide at least a portion of the secondary power supply which can be provided when power is received from one of the ESS or the utility power source, and such power source may be used in the absence of the secondary power system receiving power from one of the utility power source or the ESS. As the switching device assembly can selectively switch between the utility power feed or the ESS discharge feed, the secondary power system can provide full secondary power support to at least some electrical loads, even in the absence of the utility power feed. In some embodiments, full secondary power support refers to providing secondary power support which corresponds to the secondary power support which can be provided when the secondary power system receives electrical power from the utility power feed. For example, when a secondary power system can support forty server racks at any given time when the secondary power system receives power from the utility power feed, the secondary power system provides full secondary power support when receiving sufficient electrical power from the ESS, in the absence of the utility power feed, to support at least forty server racks for at least a certain period of time. In some embodiments, full secondary power support by a secondary power system refers to the secondary power system having sufficient power capacity, via a utility power feed, ESS discharge feed, etc., to support a set of electrical loads previously supported by at least one primary power system if the at least one primary power system fails to provide a primary power feed to those electrical loads, for at least a certain period of time. Such a certain period of time can include, for example, a two-hour period of elapsed time.

Figure 8:
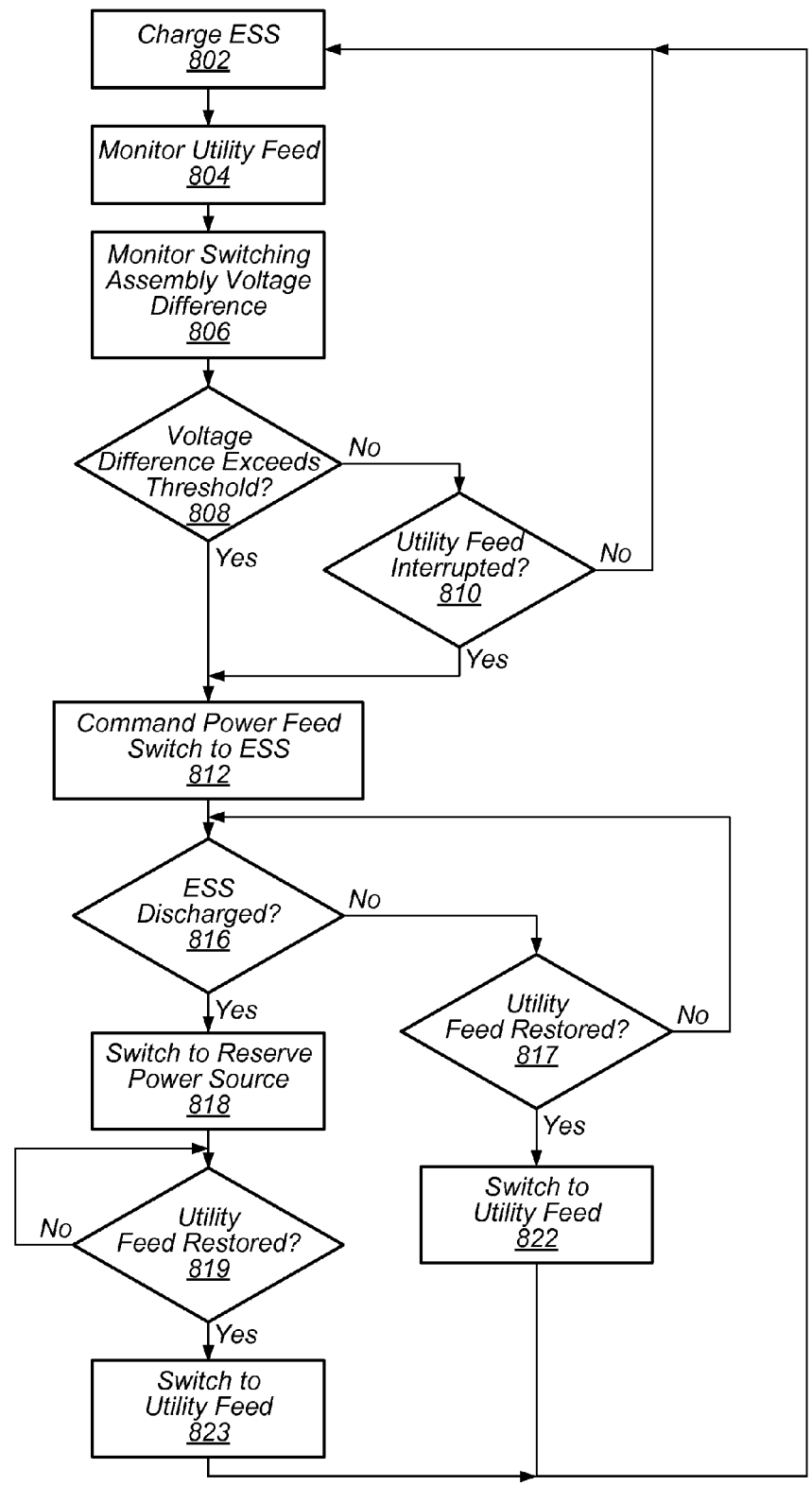
FIG. 8 illustrates managing redundant power feed support to the secondary power systems from a utility power feed or energy storage system discharge feed, according to some embodiments.

FIG. 8 illustrates managing redundant power feed support to the secondary power systems from a utility power feed or energy storage system discharge feed, according to some embodiments. Such management can be implemented as part of providing secondary power support to one or more electrical loads via a secondary power system, as illustrated at 714 in FIG. 7. The logic may be implemented by one or more control systems, including the control systems illustrated in FIG. 1-6. The control system may be implemented, in part or in full, by one or more computer systems, such as described further below with reference to FIG. 9.

At 802, one or more ESS devices are charged via a utility power feed received over a power line connection between a power transmission line carrying the utility power feed and the ESS. In some embodiments, the power transmission line includes a power bus. The ESS can store electrical power received via the utility power feed.

At 804, the utility power feed is monitored for indications of interruption. Such monitoring can include monitoring one or more characteristics of the utility power feed, including time variations in voltage, current, waveform, etc. Such monitoring can include receiving sensor data from one or more electrical sensor devices coupled to the power transmission line, where the sensor data is monitored to track various characteristics of the utility power feed.

At 806, voltages at two points in a switching device assembly are monitored to determine whether a voltage difference is present between the two points. As discussed and illustrated further above, a switching device assembly can include two parallel power line connections between a utility power transmission line, which can include a utility power bus, and separate ones of the secondary power system and the ESS. Monitoring voltages at two separate points in the switching device assembly can include monitoring separate voltage measurements for each of the separate power line connections, so that a voltage is monitored for one power line connection and another voltage is monitored for another power line connection, and a voltage difference can be a difference between the two monitored voltages. In some embodiments, a branch circuit can extend between the parallel power line connections. The branch circuit can include a switching device, which can be in an open position so that the ESS and secondary power system are isolated from each other. Monitoring voltage differences between two points in the switching device assembly can include monitoring the voltage at opposite contacts of the branch circuit switching device to determine whether a voltage difference is present between the two contacts. Such a voltage difference can provide indication that the utility power feed is interrupted, failed, or otherwise unavailable to support the secondary power system. For example, where the utility power feed fails completely, the voltage at the contact of the branch circuit switching device which is connected to the power line connection that is itself connected to the ESS, may be higher than the other contact of the branch circuit switching device, as the ESS may automatically discharge sorted electrical power into the power line connection in the absence of the utility power feed. In some embodiments, at least some voltage difference is tolerated as within normal operational limits. Therefore, monitoring the branch circuit for a voltage difference can include monitoring a voltage difference to determine if the voltage difference exceeds a predetermined threshold.

At 808, a determination is made regarding whether a voltage difference between the two points in the switching device assembly is determined to exceed one or more predetermined threshold values. In some embodiments, the threshold value is a value which indicates that a voltage difference is present, within the precision and accuracy allowed by the measurement tolerances of sensor devices via which the voltage measurements are generated. In some embodiments, the threshold value is a value which indicates the limit of tolerable voltage differences which may be due to normal variations in the utility power feed, one or more portions of the switching device assembly, etc. If not, as shown at 810, a determination is made regarding whether the utility power feed is interrupted. Such a determination can be based at least in part upon sensor data from a utility feed sensor used to monitor the utility power feed, as discussed above with reference to 804.

If, as shown at 808 and 810, either a monitored voltage difference exceeds a threshold value, or the utility power feed is determined to be interrupted, the power inlet connection of the secondary power system is commanded to be switched from the utility power feed to a discharge feed from the ESS, as shown at 812. Such a command can include one or more switching command signals generated and transmitted to one or more switching devices included in the switching device assembly. For example, where the switching device assembly includes two power line connection switches which can selectively isolate or connect the ESS and secondary power system to the utility power feed on the power line connections, and a branch circuit switching device which can selectively isolate or connect the ESS and the power inlet connection of the secondary power system, the commanding can include generated commands to the power line connection switches to switch to an open position, such that the ESS and secondary power system are isolated from the utility feed, and a generated command to the branch circuit switching device to switch to a closed position, such that the ESS and secondary power system are connected. In some embodiments, the commanding includes generating a command signal to the ESS to switch from charging via received electrical power to discharging stored electrical power.

At 816, a determination is made regarding whether the ESS is discharged beyond a threshold level. Such a threshold level can include full discharge of the ESS, 80% discharge, etc. The discharge of the ESS can, in some embodiments, be referred to as a characterization of the remaining capacity of the stored electrical power in the ESS. For example, a determination regarding whether the ESS is discharged beyond a threshold level can include a determination regarding whether the ESS stored electrical power is less than a threshold proportion of the full electrical storage capacity of the ESS (e.g., 10%). The determination can include a determination whether, at present discharge rate, historical discharge rate, some combination thereof, etc., the ESS is projected to be discharged beyond a threshold level within a certain period of future elapsed time.

At 817, a determination is made regarding whether the utility power feed is restored. Such a determination can be based at least in part upon sensor data from a utility feed sensor used to monitor the utility power feed, as discussed above with reference to 804. If the utility power feed is determined to be restored, the power inlet connection of the secondary power system is commanded to be switched from the discharge feed from the ESS to the utility power feed, as shown at 822. Such a command can include one or more switching command signals generated and transmitted to one or more switching devices included in the switching device assembly. For example, where the switching device assembly includes two power line connection switches which can selectively isolate or connect the ESS and secondary power system to the utility power feed on the power line connections, and a branch circuit switching device which can selectively isolate or connect the ESS and the power inlet connection of the secondary power system, the commanding can include generated commands to the power line connection switches to switch to a closed position, such that the ESS and secondary power system are electrically coupled to the utility feed, and a generated command to the branch circuit switching device to switch to an open position, such that the ESS and secondary power system are electrically isolated from each other. In some embodiments, the commanding includes generating a command signal to the ESS to switch from discharging stored electrical power to charging via received electrical power.

At 818, if the ESS is determined to be discharged beyond a threshold level, projected to be discharged beyond the threshold level within a certain period of time, etc., a switching command signal is generated, where the switching command signal is transmitted to a switchgear included in the secondary power system to command the switching device to switch the source of power to at least the UPS of the secondary power system from the secondary power system power inlet connection to a power feed from one or more back-up generators of the secondary power system (e.g., a generator output). Such a command generation can include generating a command to the one or more back-up generators to initialize (e.g., to start up). In some embodiments, the command signal to initialize the generator is transmitted prior to transmitting the command to the switchgear. The command to the switchgear can be transmitted upon receiving an indication that the generators are initialized. The command to the switchgear can include a command to one or more switching devices included in the switchgear.

At 819, subsequent to commanding a switchgear to switch the source of power to at least the UPS of the secondary power system from the secondary power system power inlet connection to a power feed from one or more back-up generators of the secondary power system, a determination is made regarding whether the utility power feed is restored. Such a determination can be based at least in part upon sensor data from a utility feed sensor used to monitor the utility power feed, as discussed above with reference to 804. If the utility power feed is determined to be restored, the power inlet connection of the secondary power system is commanded to be switched from the discharge feed from the ESS to the utility power feed and the switchgear is commanded to be switched to the secondary power system power inlet connection, as shown at 823, such that electrical power from the utility power feed provides a source of power to at least the UPS of the secondary power system. Such commands can include one or more switching command signals generated and transmitted to one or more switching devices included in the switching device assembly, one or more switching command signals generated and transmitted to the switchgear included in the secondary power system to switch the source of power to at least the UPS of the secondary power system from the power feed from one or more back-up generators of the secondary power system to the secondary power system power inlet connection, and one or more command signals generated and transmitted to the one or more back-up generators to shut down. In some embodiments, the command signals to the switchgear and switching device assembly are transmitted prior to transmitting the command signal to shut down the generator. The command to the generator can be transmitted upon receiving an indication that the switching device assembly and switchgear have switched as commanded. The command to the switchgear can be transmitted upon receiving an indication that the switching device assembly has switched as commanded.

Figure 9:
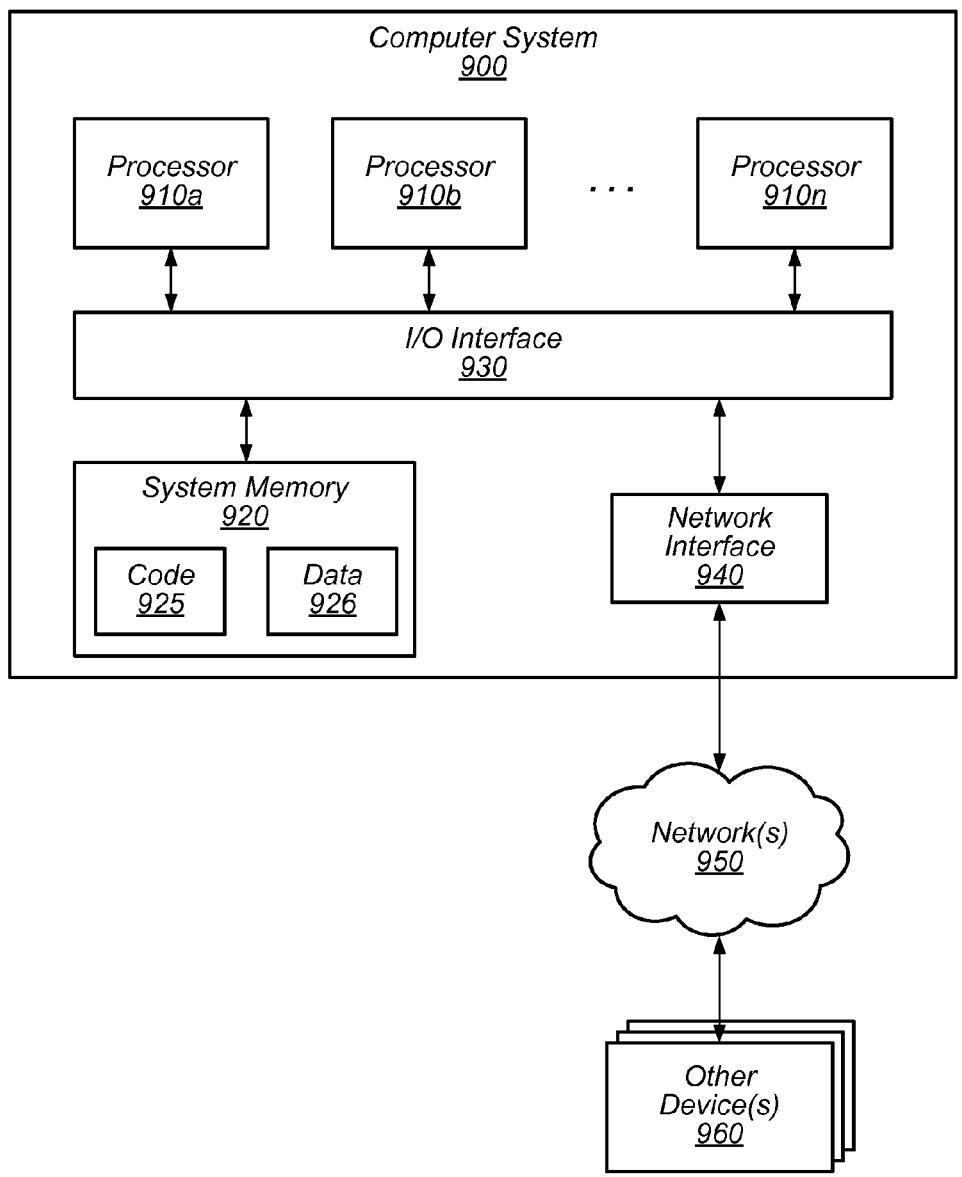
FIG. 9 is a block diagram illustrating an example computer system that may be used in some embodiments.

FIG. 9 is a block diagram illustrating an example computer system that may be used in some embodiments.

In some embodiments, a system that implements a portion or all of one or more of the technologies, including but not limited to a portion or all of the redundant secondary power feed support system, systems and components associated with the redundant secondary power feed support system, and various methods, systems, components, devices, and apparatuses as described herein, may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as a portion or all of one or more of the technologies, including but not limited to a portion or all of the redundant secondary power feed support system, systems and components associated with the redundant secondary power feed support system, and various methods, systems, components, devices, and apparatuses as described herein, are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIGS. 1 through 8, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data for implementing embodiments of methods as described above relative to FIGS. 1-8. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
one or more sets of rack computer systems configured to perform computing operations;
a primary power system configured to provide primary power support to the one or more sets of rack computer systems;
a secondary power system configured to receive power, via a power inlet connection, and to provide secondary power support, independently of the primary power support, to the one or more sets of rack computer systems;
an energy storage system (ESS) configured to selectively store power, received from a utility power feed via a power connection, or discharge the stored power via the same power connection based at least in part upon an absence of receiving power from the utility power feed via the power connection;
a switching device assembly configured to selectively route, via the power inlet connection of the secondary power system, electrical power from one of the utility power feed or power discharged from the ESS; and
an energy storage control system configured to command the switching device assembly to selectively switch between routing, to the power inlet connection of the secondary power system, electrical power from the utility power feed or power discharged from the ESS, based at least in part upon a determination of an interruption of the utility power feed.

2. The data center of claim 1, wherein:
the utility power feed comprises a utility power bus configured to distribute electrical power from a utility power source to the secondary power system and the ESS via separate bus tie connections; and
to command the switching device assembly to selectively switch between routing, to the power inlet connection of the secondary power system, electrical power from the utility power feed or power discharged from the ESS, based at least in part upon a determination of an interruption of the utility power feed, the energy storage control system is configured to command the switching device assembly to selectively switch between routing, to the power inlet connection of the secondary power system, electrical power from the utility power feed or power discharged from the ESS, based at least in part upon a determination that a voltage difference between the separate bus tie connections exceeds a predetermined threshold value.

3. The data center of claim 2, wherein:
the switching device assembly comprises:
an ESS switching device configured to selectively isolate or couple the ESS and the utility power bus via one of the separate bus tie connections;
a secondary power switching device configured to selectively isolate or couple the secondary power system from the utility power bus via another one of the separate bus tie connections; and
a branch circuit switching device configured to selectively electrically couple or isolate the separate bus tie connections, via a branch circuit, to electrically couple or isolate the ESS and the secondary power system; and
to command the switching device assembly to selectively switch between routing, to the power inlet connection of the secondary power system, electrical power from the utility power feed or power discharged from the ESS, based at least in part upon a determination that a voltage difference between the separate bus tie connections exceeds a predetermined threshold value, the energy storage control system is configured to command the branch circuit switching device to electrically couple the separate bus tie connections, based at least in part upon a determination that a voltage difference across the branch circuit switching device exceeds the predetermined threshold value.

4. The data center of claim 1, wherein:
the secondary power system comprises a reserve power source and a reserve switching device configured to selectively switch between routing power from the power inlet connection of the secondary power system or the reserve power source; and
to command the switching device assembly to selectively switch between routing, to the power inlet connection of the secondary power system, electrical power from the utility power feed or power discharged from the ESS, based at least in part upon a determination of an interruption of the utility power feed, the energy storage control system is configured to command the reserve switching device to refrain from switching from the power inlet connection of the secondary power system to the reserve power source until the ESS is completely discharged.

5. An apparatus, comprising:
an energy storage control system, communicatively coupled to a switching device assembly, that is configured to provide power feed redundancy to a secondary power system of a data center, wherein the secondary power system is configured to provide secondary power support to one or more of a plurality of rack computer systems in a data center, independently of a primary power system configured to provide primary power support to the plurality of rack computer systems;
wherein, to provide power feed redundancy to the secondary power system, the energy storage control system is configured to command the switching device assembly to selectively switch a power inlet connection of the secondary power system between a utility power feed and an energy storage system (ESS) discharge feed.

6. The apparatus of claim 5, wherein:
to provide power feed redundancy to the secondary power system, the energy storage control system is configured to command the switching device assembly to selectively switch the power inlet connection of the secondary power system from the utility power feed to the ESS discharge feed based at least in part upon a determination of an interruption of the utility power feed.

7. The apparatus of claim 6, wherein:
the ESS is configured to selectively switch between receiving power from the utility power feed or discharge the ESS discharge feed, via a particular branch circuit;
the power inlet connection of the secondary power system is configured to receive power from at least the utility power feed via another separate branch circuit; and
to command the switching device assembly to selectively switch the power inlet connection of the secondary power system from the utility power feed to the ESS discharge feed based at least in part upon a determination of the interruption of the utility power feed, the energy storage control system is configured to command the switching device assembly to selectively switch the power inlet connection of the secondary power system from the utility power feed to the ESS discharge feed, based at least in part upon a determination that a voltage difference between the particular branch circuit and the other separate branch circuit exceeds a predetermined threshold value.

8. The apparatus of claim 7, wherein:
the switching device assembly comprises:
 a branch circuit switching device configured to selectively open or close an electrical connection between the particular branch circuit and the other branch circuit to selectively electrically isolate or couple the ESS and the secondary power system; and
to command the switching device assembly to selectively switch the power inlet connection of the secondary power system from the utility power feed to the ESS discharge feed, the energy storage control system is configured to command the branch circuit switching device to close to electrically couple the ESS and the secondary power system, based at least in part upon a determination that a voltage difference across the branch circuit switching device exceeds the predetermined threshold value.

9. The apparatus of claim 8, wherein:
the switching device assembly comprises:
 an ESS switching device configured to selectively isolate or couple the particular branch circuit and the utility power feed; and
 a secondary power switching device configured to selectively isolate or couple the power inlet connection of the secondary other branch circuit and the utility power feed; and
to command the switching device assembly to selectively switch the power inlet connection of the secondary power system from the utility power feed to the ESS discharge feed, the energy storage control system is further configured to command the ESS switching device and the secondary power switching device to open to electrically isolate the ESS and the power inlet connection of the secondary power system from the utility power feed.

10. The apparatus of claim 8, wherein:
the particular branch circuit comprises a particular transformer configured to transform power flowing through the particular branch circuit between a medium-voltage and a low-voltage;
the other separate branch circuit comprises another separate transformer configured to transform power flowing through the other separate branch circuit between a medium-voltage and a low-voltage; and
commanding the branch circuit switching device to close to electrically couple the ESS and the secondary power system comprises:
 configuring the particular transformer to step-up the ESS discharge feed routed to the branch circuit switching device from the low voltage to the medium voltage, and
 configuring the other separate transformer to step-down the ESS discharge feed routed from the branch circuit switching device to the power inlet connection of the secondary power system from the medium voltage to the low voltage.

11. The apparatus of claim 6, wherein:
the energy storage control system is configured to command the switching device assembly, subsequently to commanding the switching device assembly to selectively switch the power inlet connection of the secondary power system from the utility power feed to the ESS discharge feed based at least in part upon a determination of an interruption of the utility power feed, to switch the power inlet connection of the secondary power system from the ESS discharge feed to the utility power feed, based at least in part upon a determination that the utility power feed is subsequently uninterrupted.

12. The apparatus of claim 5, wherein:
the secondary power system comprises a reserve switching device configured to selectively switch between routing electrical power from one of the power inlet connection of the secondary power system or a reserve power source; and
the energy storage control system is further configured to, based at least in part upon the switching device assembly selectively switching the power inlet connection of the secondary power system from the utility power feed to the ESS discharge feed, command the reserve switching device to refrain from switching from the power inlet connection of the secondary power system to the reserve power source until the ESS is discharged beyond at least a certain threshold limit.

13. The apparatus of claim 5, wherein a total electrical power requirement of the plurality of rack computer systems exceeds a power discharge capacity of the ESS.

14. A method, comprising:
performing, by at least one computer system:
 providing power feed redundancy to a secondary power system of a data center, wherein the secondary power system is configured to provide secondary power support to one or more of a plurality of rack computer systems in a data center, independently of a primary power system configured to provide primary power support to the plurality of rack computer systems, wherein the providing comprises:
  commanding a switching device assembly to selectively switch a power inlet connection of the secondary power system between a utility power feed and an energy storage system (ESS) discharge feed.

15. The method of claim 14, wherein the providing comprises:
commanding the switching device assembly to selectively switch the power inlet connection of the secondary power system from the utility power feed to the ESS discharge feed, based at least in part upon a determination of an interruption of the utility power feed.

16. The method of claim 15, wherein:
the ESS is configured to selectively switch between receiving power from the utility power feed or discharge the ESS discharge feed, via a particular branch circuit;
the power inlet connection of the secondary power system is configured to receive power from at least the utility power feed via another separate branch circuit; and
commanding the switching device assembly to selectively switch the power inlet connection of the secondary power system from the utility power feed to the ESS discharge feed based at least in part upon a determination of the interruption of the utility power feed comprises commanding the switching device assembly to selectively switch the power inlet connection of the secondary power system from the utility power feed to the ESS discharge feed, based at least in part upon a determination that a voltage difference between the particular branch circuit and the other separate branch circuit exceeds a predetermined threshold value.

17. The method of claim 16, wherein:
the switching device assembly comprises:
a branch circuit switching device configured to selectively open or close an electrical connection between the particular branch circuit and the other branch circuit to selectively electrically isolate or couple the ESS and the secondary power system; and
commanding the switching device assembly to selectively switch the power inlet connection of the secondary power system from the utility power feed to the ESS discharge feed comprises commanding the branch circuit switching device to close to electrically couple the ESS and the secondary power system, based at least in part upon a determination that a voltage difference across the branch circuit switching device exceeds the predetermined threshold value.

18. The method of claim 17, wherein:
the switching device assembly comprises:
an ESS switching device configured to selectively isolate or couple the particular branch circuit and the utility power feed; and
a secondary power switching device configured to selectively isolate or couple the power inlet connection of the secondary other branch circuit and the utility power feed; and
commanding the switching device assembly to selectively switch the power inlet connection of the secondary power system from the utility power feed to the ESS discharge feed comprises commanding the ESS switching device and the secondary power switching device to open to electrically isolate the ESS and the power inlet connection of the secondary power system from the utility power feed.

19. The method of claim 15, wherein the providing comprises:
commanding the switching device assembly, subsequently to commanding the switching device assembly to selectively switch the power inlet connection of the secondary power system from the utility power feed to the ESS discharge feed based at least in part upon a determination of an interruption of the utility power feed, to switch the power inlet connection of the secondary power system from the ESS discharge feed to the utility power feed, based at least in part upon a determination that the utility power feed is subsequently uninterrupted.

20. The method of claim 14, wherein:
the secondary power system comprises a reserve switching device configured to selectively switch between routing electrical power from one of the power inlet connection of the secondary power system or a reserve power source; and
commanding the switching device assembly to selectively switch the power inlet connection of the secondary power system from the utility power feed to the ESS discharge feed based at least in part upon a determination of an interruption of the utility power feed comprises commanding the reserve switching device to refrain from switching from the power inlet connection of the secondary power system to the reserve power source until the ESS is discharged beyond at least a certain threshold limit.

* * * * *